United States Patent
Oshiba et al.

(10) Patent No.: US 10,701,013 B2
(45) Date of Patent: Jun. 30, 2020

(54) MESSAGE DISPLAY CONTROL SYSTEM FOR CHATTING WITH A PLURALITY OF USERS, MESSAGE DISPLAY CONTROL SERVER FOR CHATTING WITH A PLURALITY OF USERS, MESSAGE DISPLAY CONTROL DEVICE FOR CHATTING WITH A PLURALITY OF USERS, AND INFORMATION STORAGE MEDIUM FOR DISPLAYING MESSAGES FOR CHATTING WITH A PLURALITY OF USERS

(71) Applicant: KONAMI DIGITAL ENTERTAINMENT CO., LTD., Tokyo (JP)

(72) Inventors: Shingo Oshiba, Minato-ku (JP); Yuta Mizuno, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 282 days.

(21) Appl. No.: 15/264,602

(22) Filed: Sep. 14, 2016

(65) Prior Publication Data
US 2017/0005969 A1    Jan. 5, 2017

Related U.S. Application Data

(63) Continuation of application No. PCT/JP2015/057097, filed on Mar. 11, 2015.

(30) Foreign Application Priority Data

Mar. 14, 2014    (JP) .................................. 2014-051417

(51) Int. Cl.
*H04L 12/58*    (2006.01)
*G06Q 10/10*    (2012.01)
*G06Q 50/00*    (2012.01)

(52) U.S. Cl.
CPC ............ *H04L 51/16* (2013.01); *G06Q 10/107* (2013.01); *G06Q 50/01* (2013.01); *H04L 51/046* (2013.01); *H04L 51/22* (2013.01)

(58) Field of Classification Search
CPC .......... G06F 17/00; G06F 3/01; G06F 11/075; G06F 21/10; G06T 13/00; G06Q 10/10; H04L 51/16
See application file for complete search history.

(56) References Cited

U.S. PATENT DOCUMENTS

| | | | | |
|---|---|---|---|---|
| 2002/0075291 A1* | 6/2002 | Van Gestel | ............ | G04G 11/00 715/700 |
| 2003/0134678 A1* | 7/2003 | Tanaka | .................... | G06F 3/048 463/42 |

(Continued)

FOREIGN PATENT DOCUMENTS

| | | |
|---|---|---|
| JP | 2010-134517 A | 6/2010 |
| KR | 10-2004-0065293 A | 7/2004 |

(Continued)

OTHER PUBLICATIONS

Office Action dated Dec. 2, 2016, for corresponding KR Patent Application No. 10-2016-7024848 and Computer generated English translation thereof.

*Primary Examiner* — Li P Sun
*Assistant Examiner* — Qi Wan
(74) *Attorney, Agent, or Firm* — HEA Law PLLC

(57) ABSTRACT

A message display control device comprising at least one processor configured to: display at least one of a plurality of message objects on a display; acquire a determination result about whether or not a reference display time period has elapsed for each of the at least one of the plurality of message objects; and display a new message object on the (Continued)

display, on which the at least one of the plurality of message objects are displayed, based on the determination result.

20 Claims, 22 Drawing Sheets

(56) References Cited

U.S. PATENT DOCUMENTS

| | | | | |
|---|---|---|---|---|
| 2004/0078694 A1* | 4/2004 | Lester | ............... | H04L 43/0817 714/39 |
| 2006/0114257 A1* | 6/2006 | Nishimi | ............... | H04N 1/0035 345/467 |
| 2008/0096538 A1* | 4/2008 | Kim | ............... | H04M 1/72552 455/418 |
| 2009/0199111 A1* | 8/2009 | Emori | ............... | G06T 13/00 715/758 |
| 2009/0307393 A1* | 12/2009 | Hasti, Sr. | ............... | H04L 47/564 710/54 |
| 2010/0138503 A1 | 6/2010 | Ishikawa et al. | | |
| 2010/0186092 A1* | 7/2010 | Takechi | ............... | G06F 21/10 726/26 |
| 2010/0223561 A1* | 9/2010 | Martin | ............... | G06F 3/048 715/752 |
| 2013/0055112 A1* | 2/2013 | Joseph | ............... | G06Q 10/107 715/758 |
| 2014/0118263 A1* | 5/2014 | Tajima | ............... | G06F 3/04895 345/168 |
| 2014/0380248 A1* | 12/2014 | Pangasa | ............... | G06F 3/04883 715/863 |
| 2015/0006296 A1* | 1/2015 | Gupta | ............... | G06Q 30/0269 705/14.66 |
| 2015/0154062 A1* | 6/2015 | Watanabe | ............... | G06F 11/0751 714/26 |

FOREIGN PATENT DOCUMENTS

| | | |
|---|---|---|
| KR | 10-2005-0048248 A | 5/2005 |
| KR | 10-2013-0029475 A | 3/2013 |

* cited by examiner

FIG.6

| MESSAGE ID | INPUTTER INFORMATION | TIME INFORMATION | REFERENCE DISPLAY TIME PERIOD | MESSAGE |
|---|---|---|---|---|
| 001 | USER A | 10:25:36 | 2 SECONDS | GOOD LUCK |
| 002 | USER B | 10:25:39 | 2 SECONDS | HAVE FUN |
| 003 | USER C | 10:25:40 | 2 SECONDS | LET'S DO IT |
| . | . | . | . | . |
| . | . | . | . | . |
| . | . | . | . | . |

FIG.14
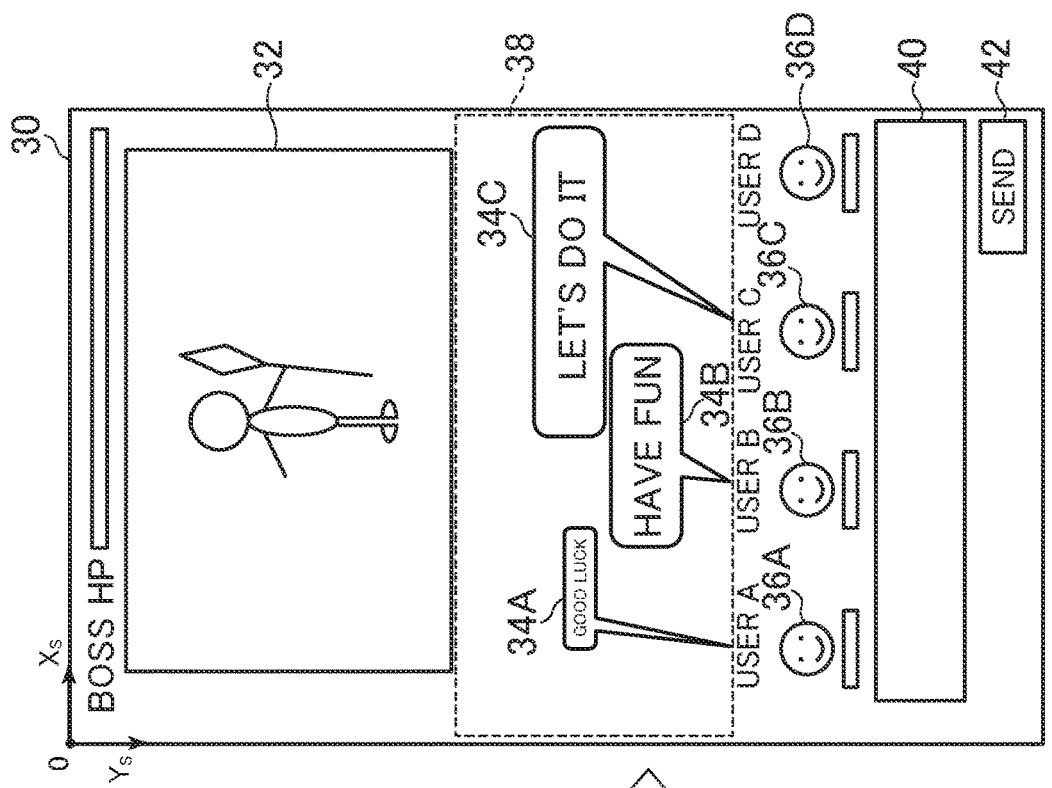
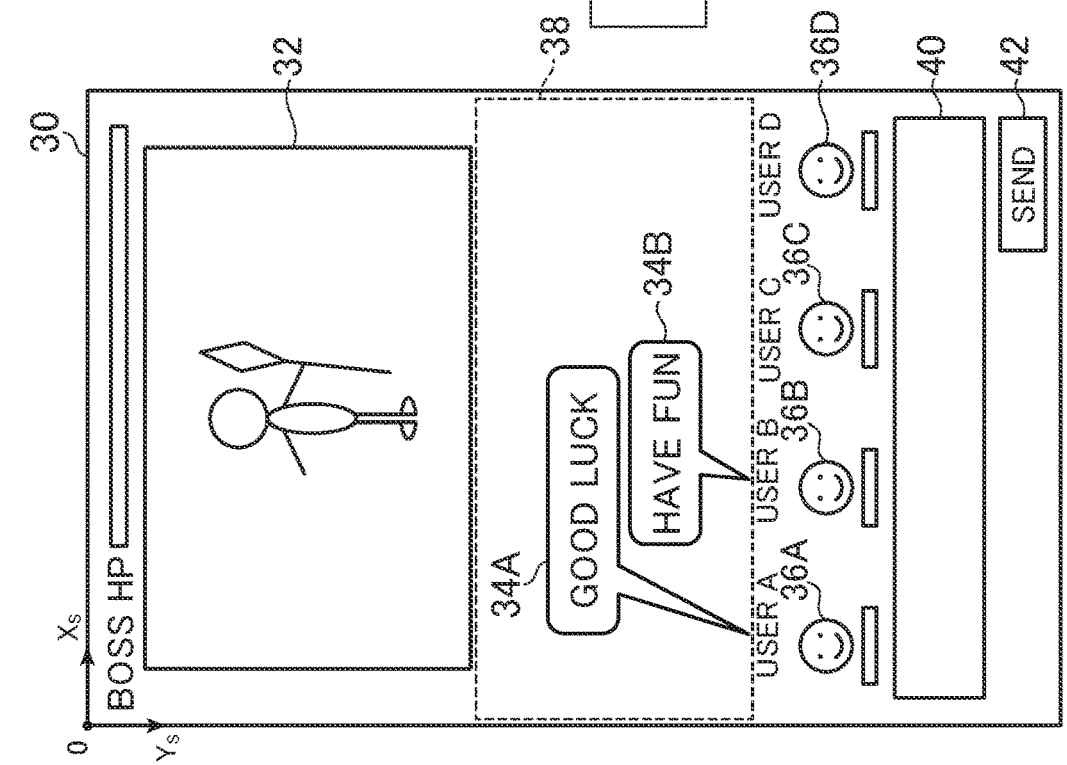

FIG.15
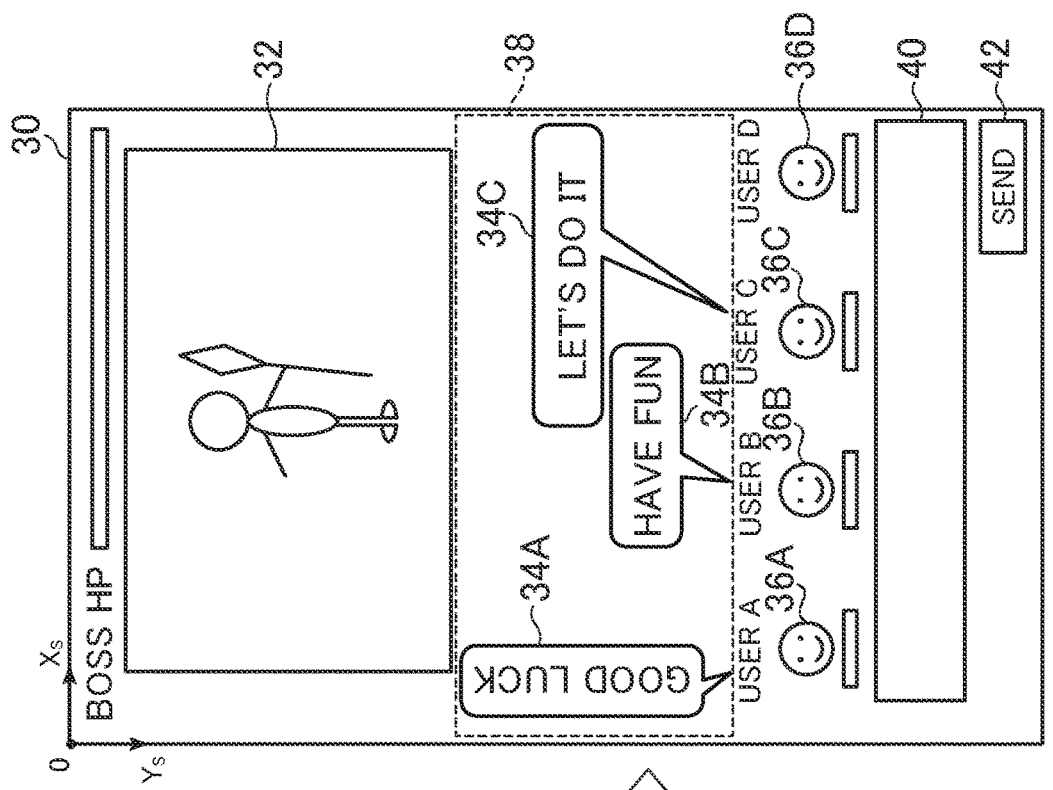
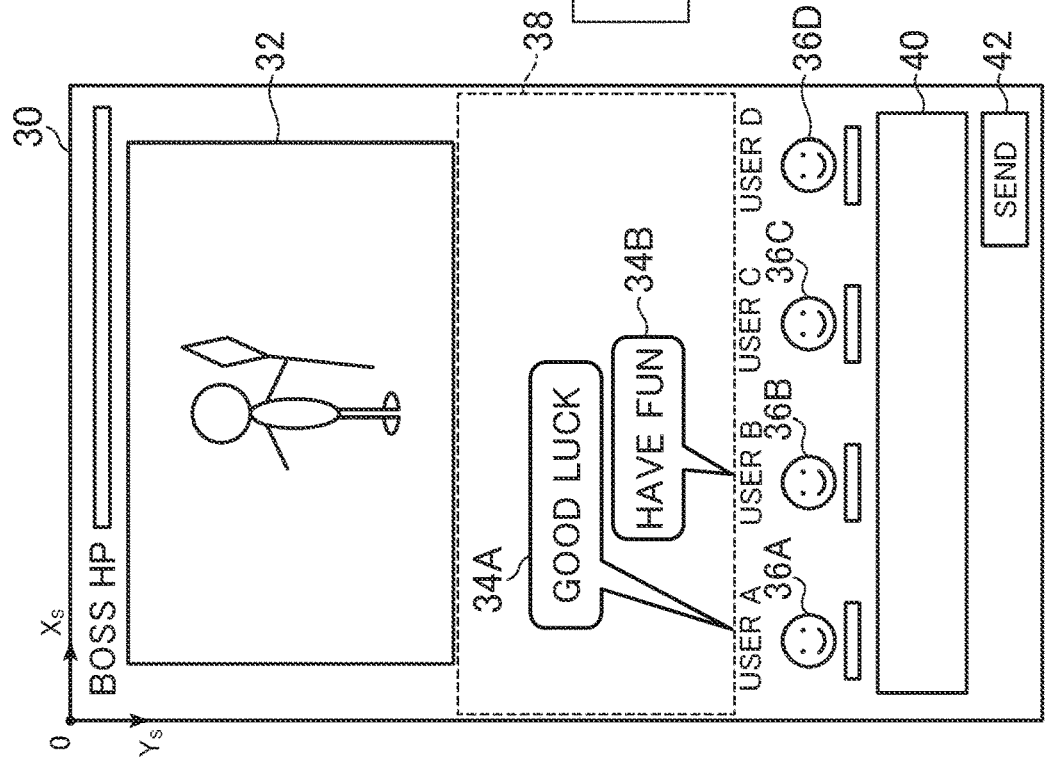

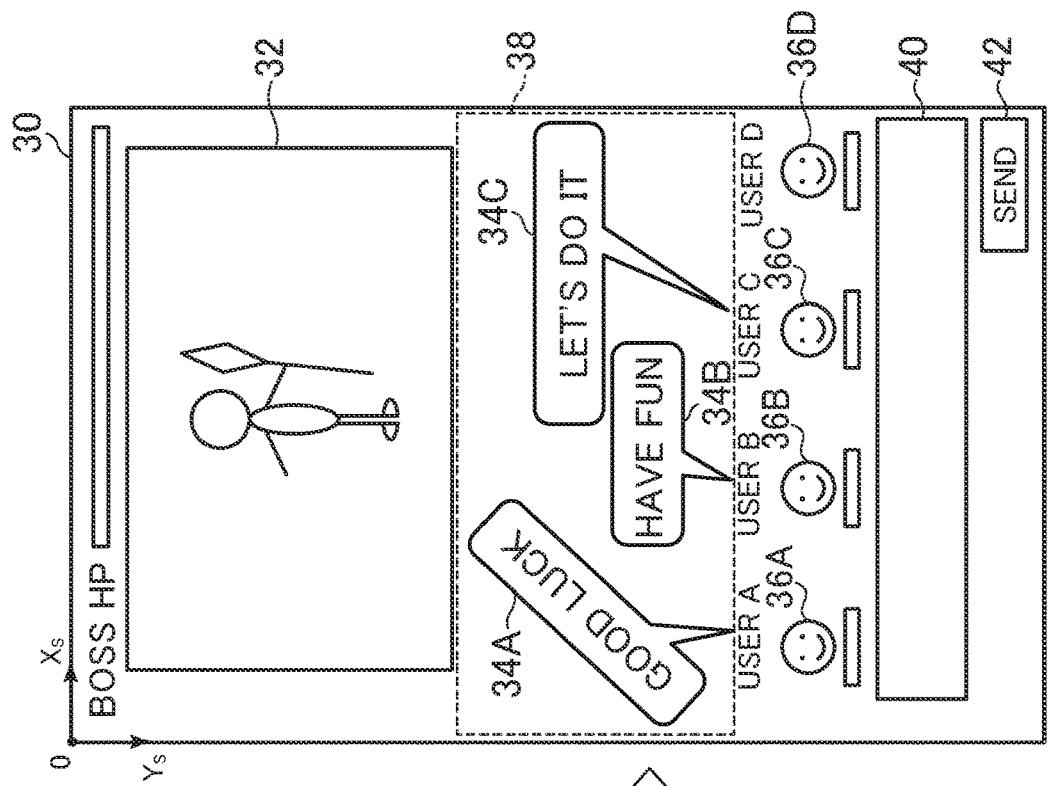
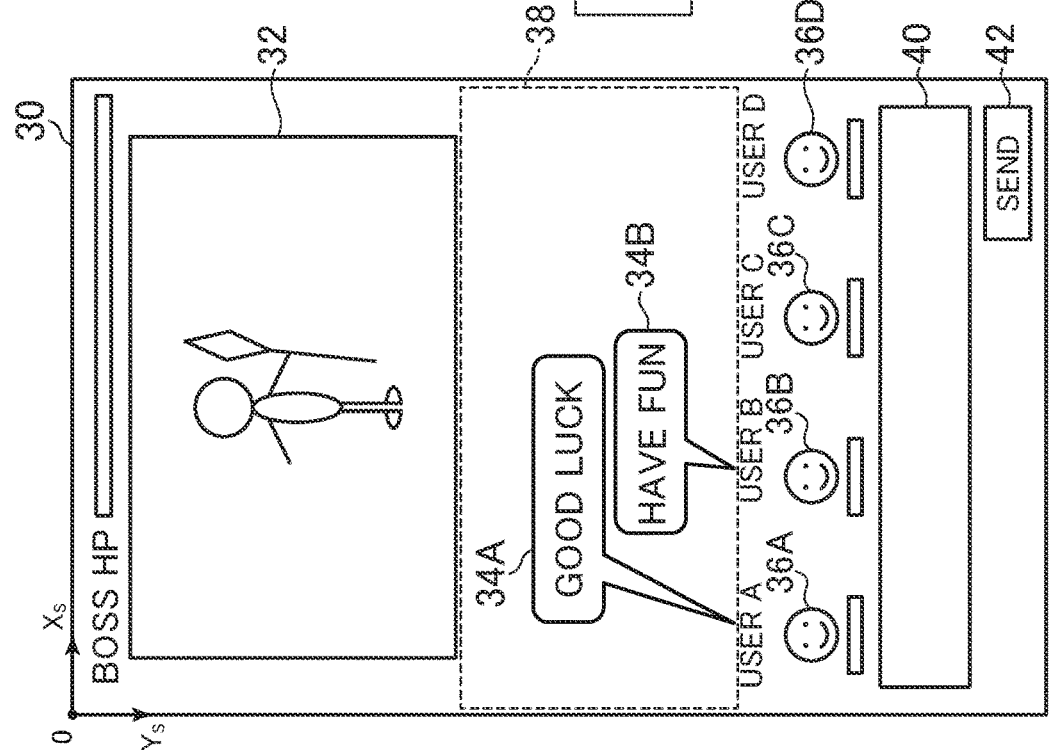
FIG.16

FIG.18
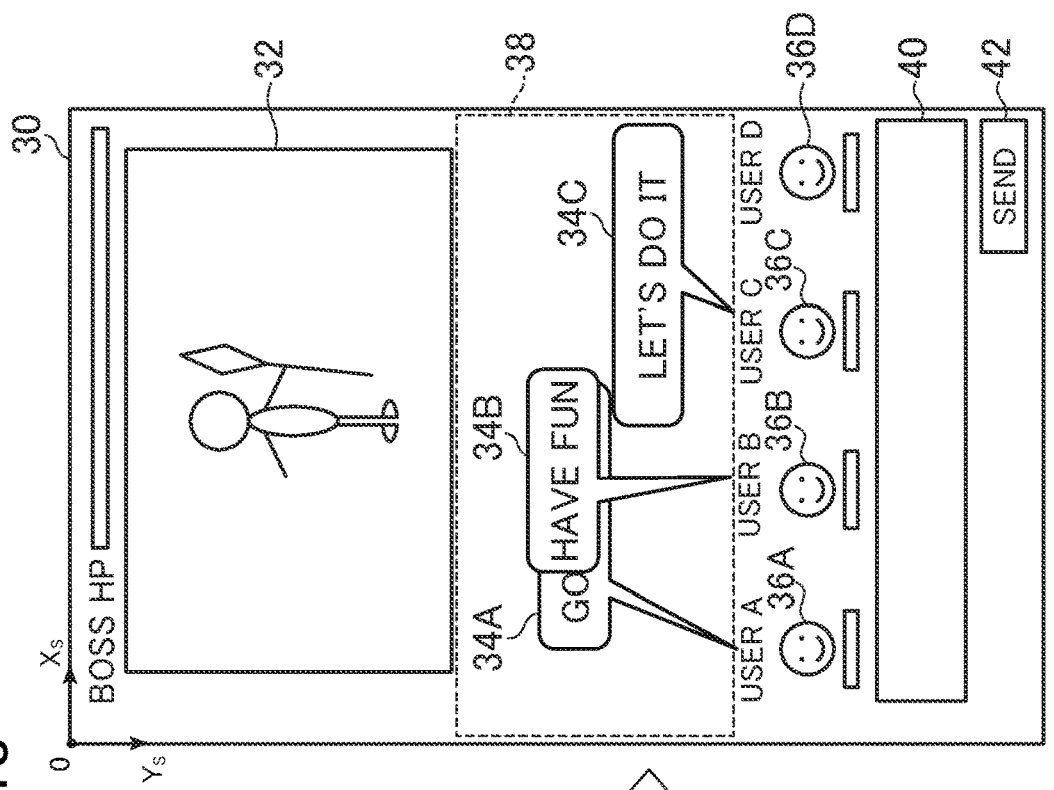
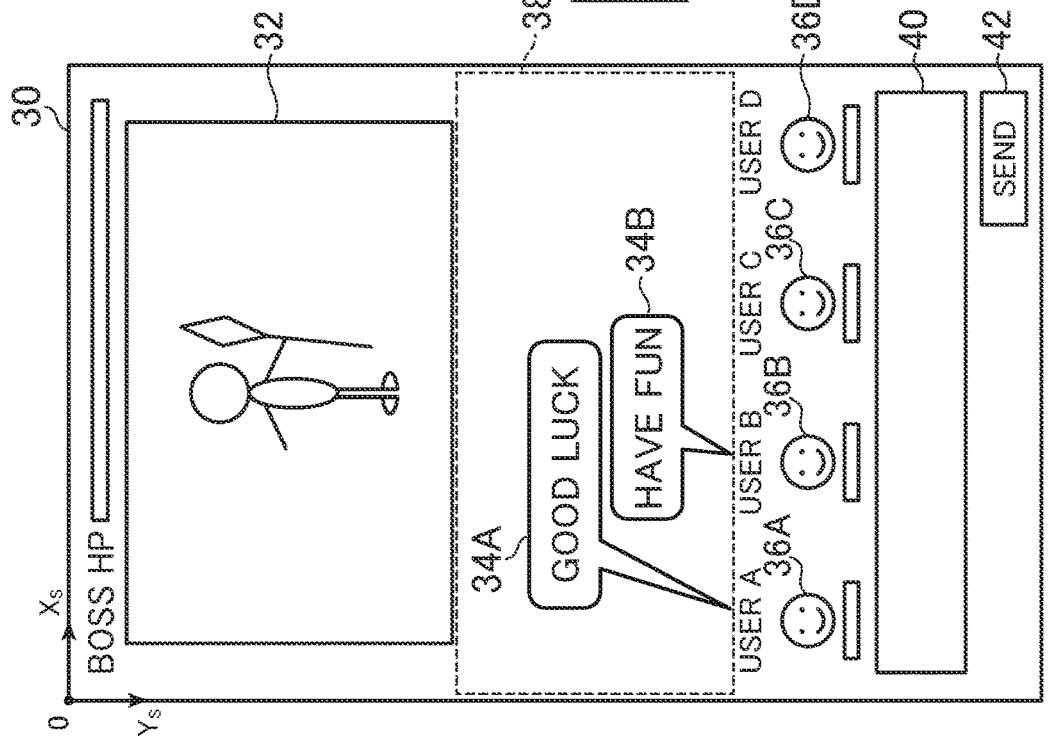

FIG.19

| MESSAGE ID | INPUTTER INFORMATION | TIME INFORMATION | REFERENCE DISPLAY TIME PERIOD | MESSAGE |
|---|---|---|---|---|
| 001 | USER A | 10:25:36 | 2 SECONDS | GOOD LUCK |
| 002 | USER B | 10:25:39 | 1.5 SECONDS | HAVE FUN |
| 003 | USER C | 10:25:40 | 2 SECONDS | LET'S DO IT |
| 004 | USER D | 10:25:50 | 7 SECONDS | GOOD LUCK, EVERYONE! TODAY'S BOSS IS STRONG, SO LET'S GIVE IT OUR ALL! |

MESSAGE DISPLAY CONTROL SYSTEM
FOR CHATTING WITH A PLURALITY OF
USERS, MESSAGE DISPLAY CONTROL
SERVER FOR CHATTING WITH A
PLURALITY OF USERS, MESSAGE DISPLAY
CONTROL DEVICE FOR CHATTING WITH
A PLURALITY OF USERS, AND
INFORMATION STORAGE MEDIUM FOR
DISPLAYING MESSAGES FOR CHATTING
WITH A PLURALITY OF USERS

CROSS-REFERENCE TO RELATED
APPLICATION

The present disclosure contains subject matter related to that disclosed in Japanese Patent Application JP2014-051417 filed in the Japan Patent Office on Mar. 14, 2014 and International Patent Application PCT/JP2015/057097 filed in the Japan Patent Office on Mar. 11, 2015, the entire contents of which are hereby incorporated by reference.

BACKGROUND OF THE INVENTION

1. Field of the Invention

The present invention relates to a message display control device, a message display control system, a message display control server, and an information storage medium therefor.

2. Description of the Related Art

Hitherto, there is known a technology for displaying a plurality of message objects on display means. For example, in JP 2010-134517 A, there is disclosed a device configured to display a message object representing a message input by each user in a chat joined by a plurality of users.

SUMMARY OF THE INVENT ION

In such a technology as described above, with a large number of message objects, it is sometimes not possible to display all the message objects within a screen (or display target region for displaying a message, which is set within the screen). Further, with a large number of message objects, it is sometimes difficult for a user to view each individual message object. In such a case, for example, it is conceivable to display a new message object after erasing an old message object from the screen, or to display a new message object so as to be overlaid on an old message object. However, with this configuration, the user sometimes fails to view an old message object before confirming the message object.

The present invention has been made in view of the above-mentioned problem, and has an object to provide a message display control device, a message display control system, a message display control server, and an information storage medium therefor, which are capable of ensuring a time period for confirming a message object.

In order to solve the above-mentioned problem, a message display control device according to one embodiment of the present invention relates to a message display control device comprising at least one processor configured to: display at least one of a plurality of message objects on a display; acquire a determination result about whether or not a reference display time period has elapsed for each of the at least one of the plurality of message objects; and display a new message object on the display, on which the at least one of the plurality of message objects are displayed, based on the determination result.

Further, a message display control server according to one embodiment of the present invention relates to a message display control server comprising at least one processor configured to: communicate to and from a message display control device that displays a new message object on display on which at least one of a plurality of message objects are displayed; acquire a determination result made about whether or not a reference display time period has elapsed for each of the at least one of the plurality of message objects displayed on the display; and transmit data to be used for displaying the new message object on the display, on which the at least one of the plurality of message objects are displayed, to the message display control device based on the determination result.

Further, a message display control system according to one embodiment of the present invention relates to a message display control system comprising at least one processor configured to: display a new message object on display on which at least one of a plurality of message objects are displayed; determine whether or not a reference display time period has elapsed for each of the at least one of the plurality of message objects displayed on the display; and display the new message object on the display on which the at least one of the plurality of message objects are displayed based on a determination result.

BRIEF DESCRIPTION OF THE DRAWINGS

FIG. 6 is a table for showing a data storage example of a message database.

FIG. 14 is a diagram for illustrating a change of a game screen according to Modification Example (3-1) of the present invention.

FIG. 15 is a diagram for illustrating an example of a game screen according to Modification Example (3-2) of the present invention.

FIG. 16 is a diagram for illustrating an example of a game screen according to Modification Example (3-3) of the present invention.

FIG. 18 is a diagram for illustrating an example of the game screen obtained when a display region for the message object that has been displayed for a reference display time period is used indirectly.

FIG. 19 is a table for showing a storage example of message data.

DETAILED DESCRIPTION OF THE INVENTION

1. Overall Configuration of Message Display Control System

Now, an exemplary embodiment of the present invention is described in detail with reference to the drawings. This embodiment is described by taking an example in which a message display control device, a message display control server, and a message display control system according to the present invention are applied to a case where a chat joined by a plurality of user is controlled.

Figure 1:
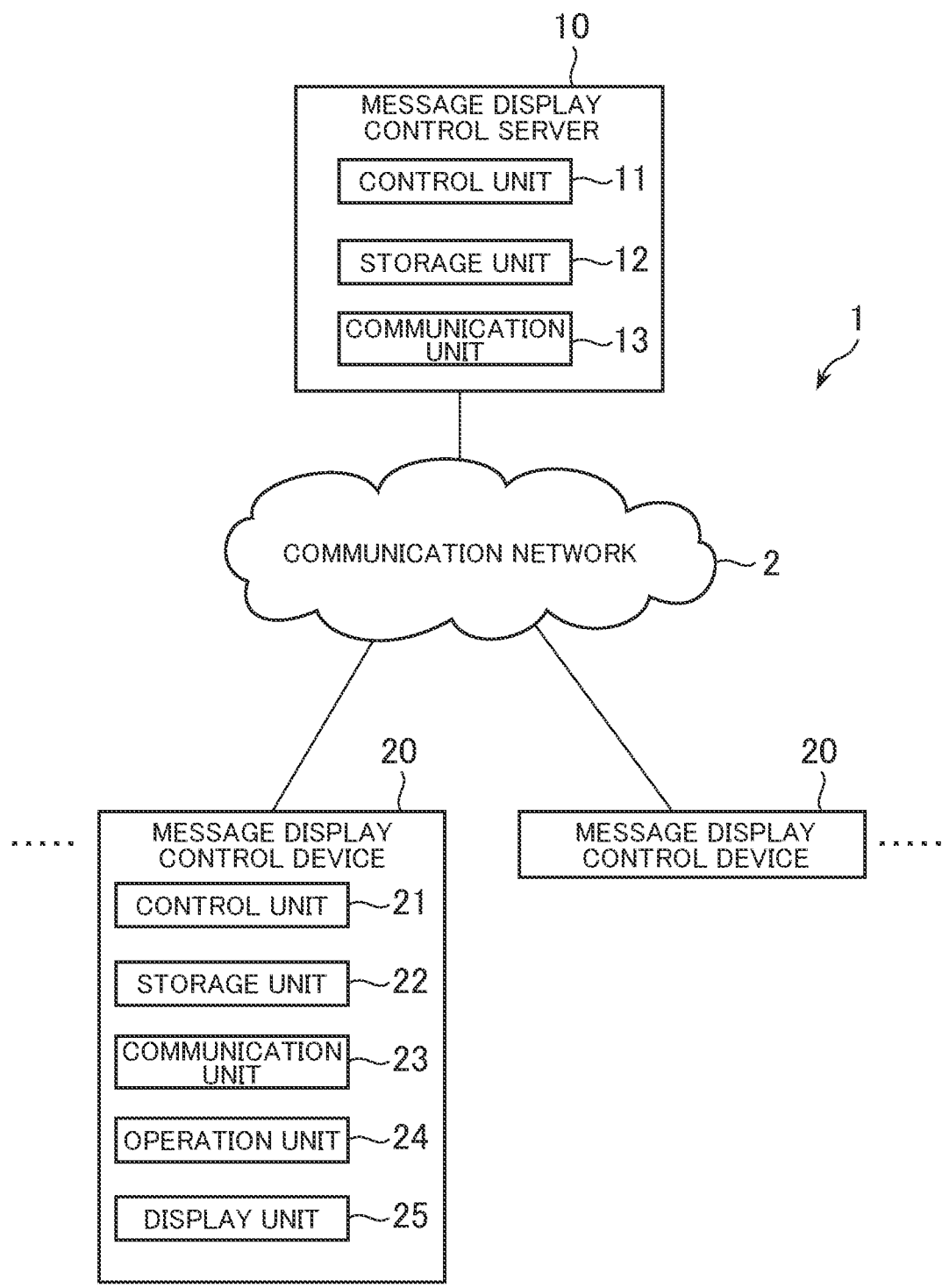
FIG. 1 is a diagram for illustrating an overall configuration of a message display control system according to an embodiment of the present invention.

FIG. 1 is a diagram for illustrating an overall configuration of a message display control system according to the embodiment. As illustrated in FIG. 1, a message display control system 1 includes a message display control server 10 and a plurality of message display control devices 20. The message display control server 10 and the respective message display control devices 20 are connected to one another through a communication network 2 so as to enable data transmission and reception thereamong.

The message display control server 10 is achieved by a server computer. As illustrated in FIG. 1, the message display control server 10 includes a control unit 11, a storage unit 12, and a communication unit 13. For example, the control unit 11 includes a microprocessor and others, and is configured to execute processing in accordance with an operating system or other programs. The storage unit 12 includes a main memory unit (for example, RAM) and an auxiliary storage unit (for example, hard disk drive or solid state drive). The communication unit 13 is configured to communicate data via the communication network 2.

In this embodiment, the message display control device 20 is a computer operated by the user. For example, the message display control device 20 is achieved by a mobile phone (including a smartphone), a mobile information terminal (including a tablet computer), a game machine, or a personal computer. As illustrated in FIG. 1, the message display control device 20 includes a control unit 21, a storage unit 22, a communication unit 23, an operation unit 24, and a display unit 25.

The control unit 21, the storage unit 22, and the communication unit 23 are the same as the control unit 11, the storage unit 12, and the communication unit 13 of the message display control server 10. The operation unit 24 is an input device, and is, for example, a touch panel. The display unit 25 is, for example, a liquid crystal display panel or an organic EL display, and is configured to display various images based on an instruction issued by the control unit 21.

In this embodiment, programs and data described as being stored in the storage unit 12 and the storage unit 22 may be supplied to, for example, the message display control server 10 and the message display control device 20 through the communication network 2. Further, the message display control server 10 or the message display control device 20 may include a component configured to read a program or data stored on a computer readable information storage medium (for example, memory card). Then, the program or data may be supplied to the message display control server 10 or the message display control device 20 through the information storage medium.

2. Chat Executed by Message Display Control System

Next, a chat executed by the message display control system 1 is described by taking, as an example, a scene in which four users playing a game have a chat while cooperating with one another in order to beat a common enemy. In this case, those four users are referred to respectively as "users A, B, C, and D", and unless otherwise particularly specified, referred to simply as "user". Further, in this case, the user represents a person who inputs a message (person who operates the message display control device 20), and may be regarded as a player of the game.

Figure 2:
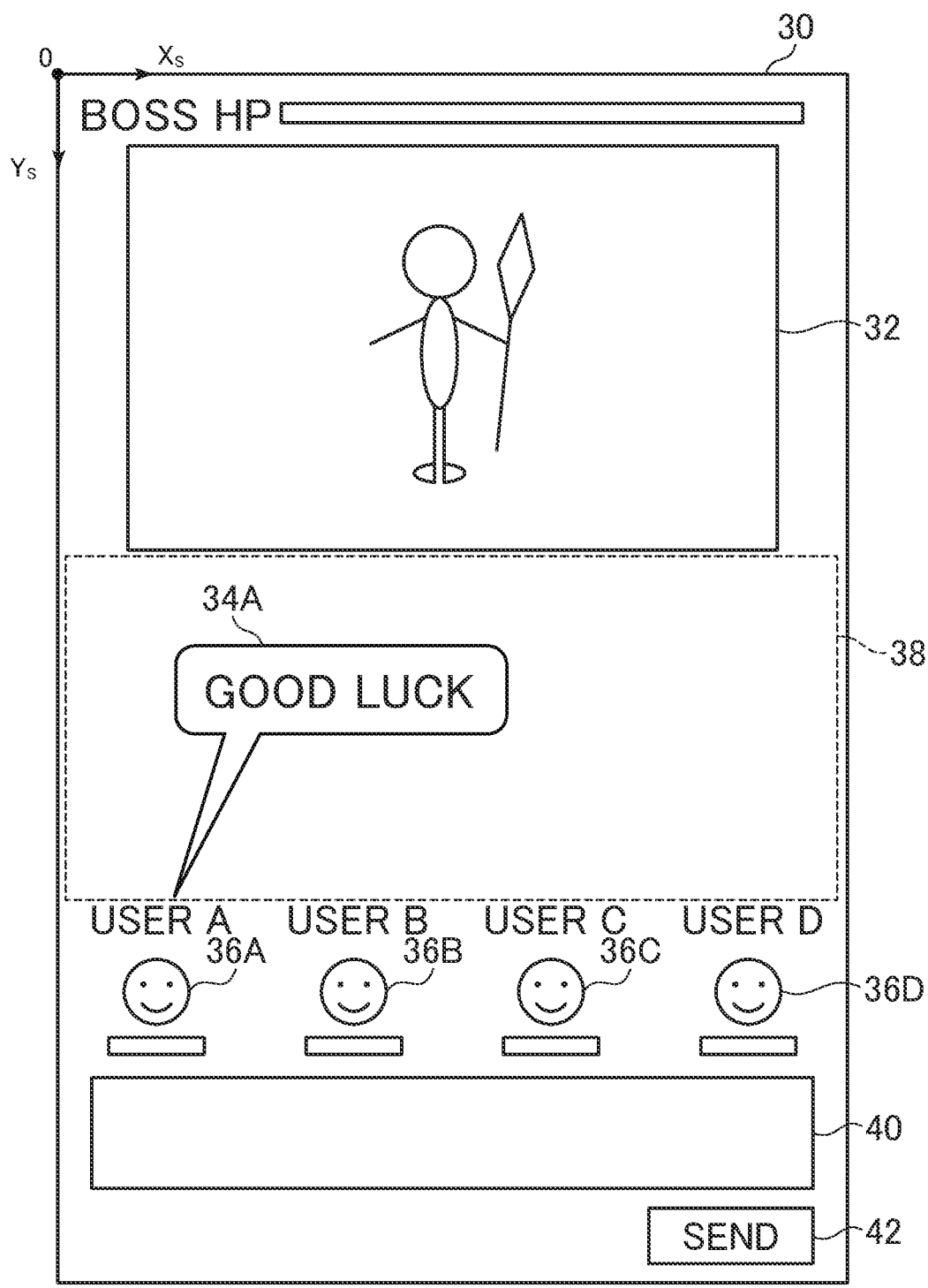
FIG. 2 is a diagram for illustrating an example of a game screen displayed on a message display control device.

FIG. 2 is a diagram for illustrating an example of a game screen displayed on the message display control device 20. In this case, for the sake of brevity of description, a case where the same game screen 30 is displayed on the message display control device 20 of each of the users A to D is described, but a content of the game screen 30 may differ depending on the message display control device 20.

As illustrated in FIG. 2, on the game screen 30, there are displayed a game image 32 for showing a situation of a game in execution, a message object 34A representing a message input by the user A (hereinafter referred to simply as "message object 34" when the message object 34A does not need to be distinguished from message objects 34B and 34C described later), and avatar images 36A to 36D (hereinafter also referred to collectively as "avatar image 36") representing the respective users.

The message represents a content of information transmitted between the devices operated by the user, and is, for example, a symbol string, an image, a moving image, or a voice that is input or specified by the user or a combination thereof. In this case, the symbol string means not only a character string (text) but also symbols other than a language (for example, an emoticon, an ASCII art, or symbols, e.g., a plus sign and a minus sign, which form a code recognizable to only the users). The message object 34 is an image representing a message. For example, in the example illustrated in FIG. 2, the message object 34 is a balloon image including the message. When being merely described as "message", the message indicates the content itself of the text or the like, and when being described as "message object 34", the message object 34 indicates a display target on the display unit 25, which are distinguished from each other. Further, the message object 34 may be expressed three-dimensionally within a virtual space instead of being expressed two-dimensionally as illustrated in FIG. 2.

The message object 34 cannot be displayed in every position on the game screen 30, but is displayed within a partial displayable region 38 so as to prevent the message object 34 from overlapping with the game screen 32. This is because, when the message object 34 overlaps with the game screen 32, the game screen 32 becomes invisible, which inhibits the user from confirming the situation of the game in execution.

Further, an input form 40 used by the user to input a message and a send button 42 for transmitting the message input into the input form 40 are displayed on the game screen 30. The user can transmit a new message by inputting a message into the input form 40 and selecting the send button 42. For example, the message object 34A represents the message input into the input form 40 when the user A selects the send button 42. Therefore, the message object 34A is displayed in such a manner that a balloon is drawn from the avatar image 36A of the user A, and can be identified as being the message input by the user A.

In the state illustrated in FIG. 2, only the message object 34A is displayed within the displayable region 38, and hence there remains space sufficient to display a new message object 34. Therefore, even when the user B inputs a new message, the message object 34B representing the new message can be displayed without an overlap with the message object 34A.

Figure 3:
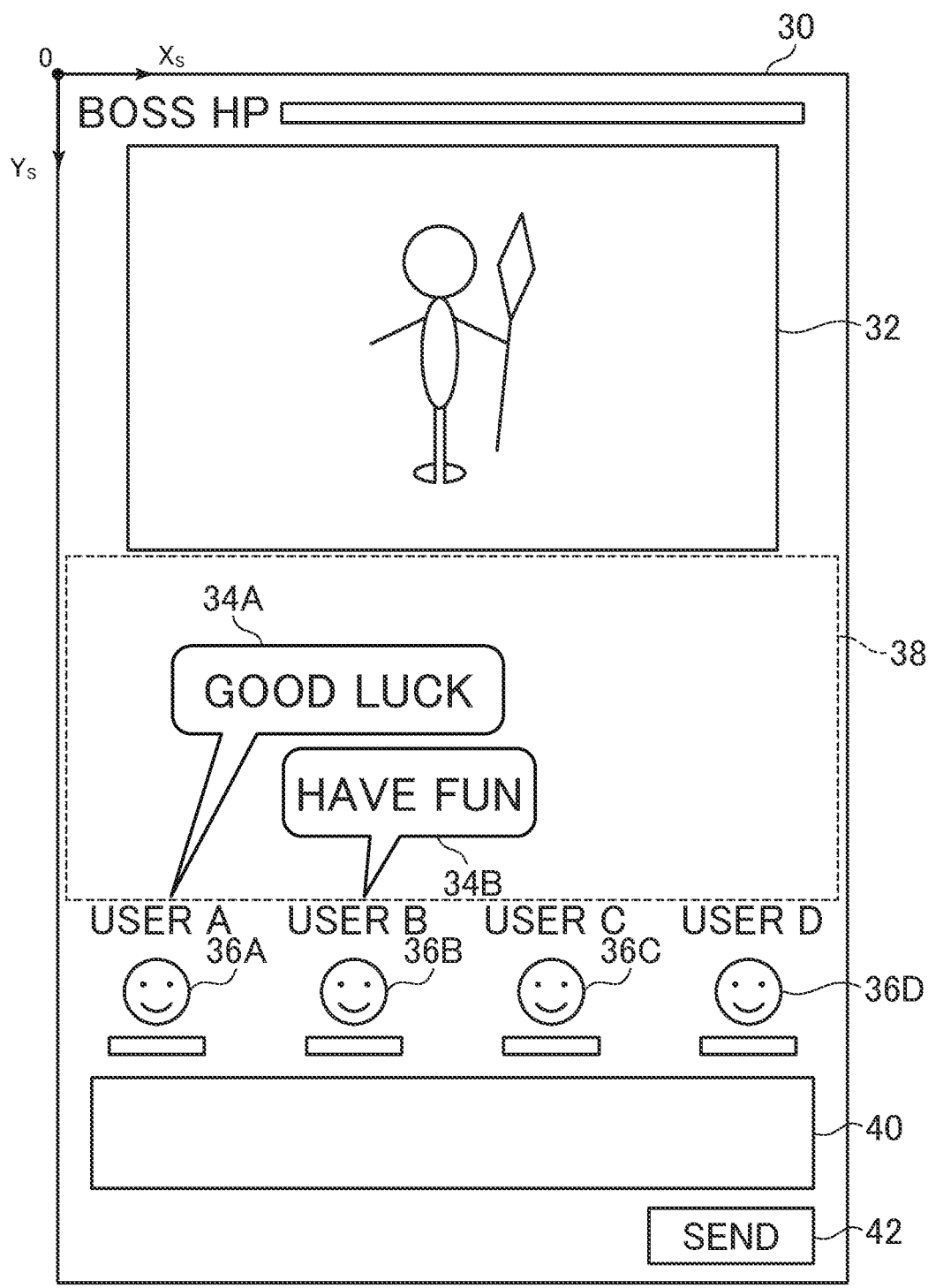
FIG. 3 is a diagram for illustrating how message objects are displayed.

FIG. 3 is a diagram for illustrating how the message object 34B is displayed. As illustrated in FIG. 3, the message object 34B is displayed in such a manner that a balloon is drawn from the avatar image 36B of the user B without an overlap with the message object 34A. In this state, the message objects 34A and 34B are displayed within the displayable region 38 with little space remaining for displaying a new message object 34, and hence when the user C attempts to input a new message to display the message object 34C representing the new message, the message object 34C overlaps with at least one of the message objects 34A and 34B, which inhibits the user from confirming an overlapping part. Therefore, this embodiment is configured to set the shortest time period required for display of each message object 34 so as to prevent the each message object 34 from being hidden by another message object 34, and to display the new message object 34 so as to overlap with the message object 34 that has been displayed for the above-mentioned time period without an overlap with the message object 34 that has not been displayed for the above-mentioned time period. For example, the message object 34A is a relatively old message and has been displayed for the shortest time period required for the display, and hence it is highly probable that the user has confirmed the message. However, the message object 34B is a relatively new message and has not yet been displayed for the shortest time period required for the display, and hence it is highly probable that the user has not confirmed the message. Therefore, it is preferred to display a new message object 34C so as to be overlaid on the message object 34A rather than on the message object 34B.

Figure 4:
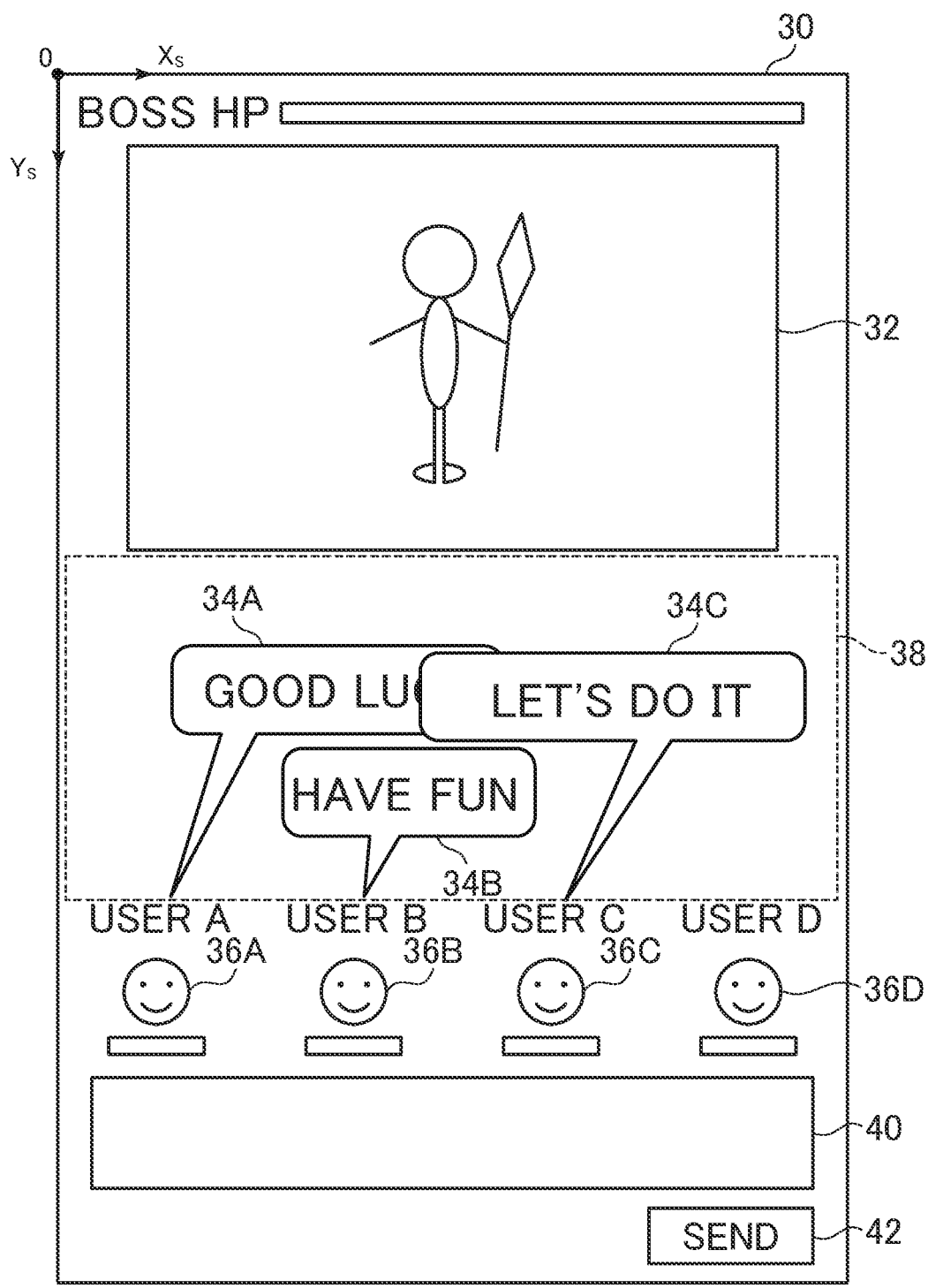
FIG. 4 is a diagram for illustrating how message objects are displayed.

FIG. 4 is a diagram for illustrating how the message object 34C is displayed. As illustrated in FIG. 4, the message object 34C is displayed so as to overlap with the message object 34A having a high probability of having been confirmed by the user without an overlap with the message object 34B having a low probability of having been confirmed by the user. With this configuration, it is possible to display the new message object 34C while ensuring a time period for confirming the message object 34B. Processing for achieving this technology is described below in detail.

3. Functions Achieved by Message Display Control System

Figure 5:
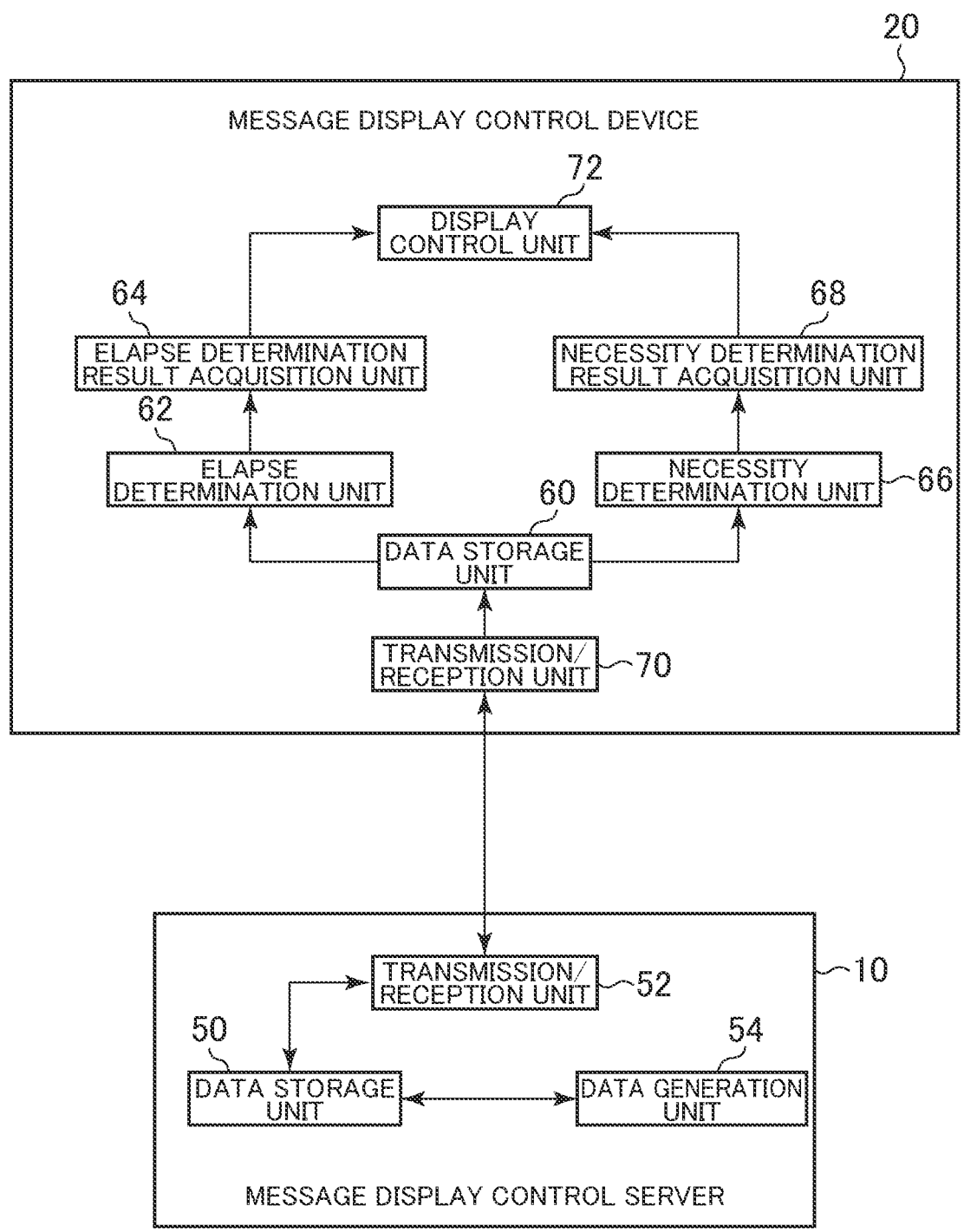
FIG. 5 is a functional block diagram for illustrating functions relating to the present invention among functions achieved by the message display control system.

FIG. 5 is a functional block diagram for illustrating functions relating to the present invention among functions achieved by the message display control system 1. In this case, functions achieved by the message display control server 10 are described, and then functions achieved by each message display control device 20 are described. In FIG. 5, only one message display control device 20 is illustrated for the sake of brevity, but the same functions are achieved by the respective message display control devices 20.

[3-1. Functions Achieved by Message Display Control Server]

On the message display control server 10, a data storage unit 50, a transmission/reception unit 52, and a data generation unit 54 are achieved. For example, the data storage unit 50 is achieved mainly by the storage unit 12, the transmission/reception unit 52 is achieved mainly by the control unit 11 and the communication unit 13, and the data generation unit 54 is achieved mainly by the control unit 11.

[Data Storage Unit]

The data storage unit 50 is configured to store a message database. FIG. 6 is a table for showing a data storage example of the message database. As shown in FIG. 6, the message database stores a message ID, inputter information, time information, a reference display time period, and a message in association with one another. In the following, each record stored in the message database is referred to as "message data" relating to the message. The message data is data required for managing the message (for example, specifying or displaying the message), and in this case, can be said to be data including data required for displaying the message.

The message ID represents information for uniquely identifying each message. The inputter information represents information for identifying an inputter (sender), and for example, is information for identifying the user having input the message or information for identifying the message display control device 20 that has received the input of the message. The time information represents information indicating a time at which the message was input. The time information may be indicated by date and time, or may be indicated only by time. The reference display time period represents a time period set as a time period to be ensured to allow the user to confirm the message object 34. The message object 34 keeps being displayed without being erased even after the reference display time period has elapsed. The reference display time period may be common to all messages, or may differ depending on the message. In this case, for the sake of brevity of description, it is assumed that the common reference display time period is used.

[Transmission/Reception Unit]

The following processing conducted by the transmission/reception unit 52 is executed by the control unit 11, and more specifically, is executed when the control unit 11 transmits an instruction to the communication unit 13. The transmission/reception unit 52 is configured to transmit and receive various kinds of data to and from the transmission/reception unit 70. For example, the transmission/reception unit 52 receives, from the message display control device 20 of each user, a message input notification indicating that a message has been input. Further, the transmission/reception unit 52 transmits the message data generated by the data generation unit 54 to the message display control device 20 of each user.

[Data Generation Unit]

The following processing conducted by the data generation unit 54 is executed by the control unit 11. The data generation unit 54 is configured to generate, when the message input notification is received, the message data based on the content of the received notification. For example, when the transmission/reception unit 52 receives the message input notification, the data generation unit 54 issues a message ID to the message indicated by the message input notification, and stores the message into the message database along with the inputter information indicating the transmission source of the message input notification, a current date and time, and the reference display time period. In this embodiment, information indicating the reference display time period is assumed to be stored on the data storage unit 50 in advance.

[3-2. Functions Achieved by Each Message Display Control Device]

On the message display control device 20, a data storage unit 60, an elapse determination unit 62, an elapse determination result acquisition unit 64, a necessity determination unit 66, a necessity determination result acquisition unit 68, a transmission/reception unit 70, and a display control unit 72 are achieved. The data storage unit 60 is achieved mainly by the storage unit 22, and the transmission/reception unit 70 is achieved mainly by the control unit 21 and the communication unit 23. The display control unit 72 is achieved mainly by the control unit 21 and the display unit 25, and other functions are achieved mainly by the control unit 21.

[Data Storage Unit]

The data storage unit 60 is configured to store data required for displaying the game screen 30. For example, the data storage unit 60 stores the message data received from the transmission/reception unit 52 of the message display control server 10 by the transmission/reception unit 70 described later. Therefore, in this embodiment, the same content as that of the message database is stored on the data storage unit 60. The message object 34 that has been displayed for a fixed time period is erased from the display unit 25, and hence the message data used for displaying the message object 34 may be erased from the data storage unit 60 after the fixed time period has elapsed.

Figure 7:
FIG. 7 is a table for showing an example of message display management information.

Further, the data storage unit 60 stores message display management information relating to the message object 34 displayed on the display unit 25. FIG. 7 is a table for showing an example of the message display management information. As shown in FIG. 7, in the message display management information, the message ID, a display start time, display coordinates, and a display priority are associated with one another. The message display management information represents information for managing the display of the message object 34 displayed on the display unit 25.

The message ID represents the message ID of the message represented by the message object 34 displayed on the display unit 25. The display start time represents a time at which the message object 34 started being displayed. The display coordinates represent coordinates indicating a display position of the message object 34. In this case, the display coordinates are expressed in a screen coordinate system having an origin set to the top left of the game screen 30. The display priority represents information indicating whether or not the reference display time period has elapsed. For example, a display priority of "1" indicates that the reference display time period has not elapsed, and a display priority of "0" indicates that the reference display time period has elapsed.

[Elapse Determination Unit and Elapse Determination Result Acquisition Unit]

The following processing conducted by the elapse determination unit 62 and the elapse determination result acquisition unit 64 is executed by the control unit 21. The elapse determination unit 62 is configured to determine whether or not the reference display time period has elapsed for each of at least one of a plurality of message objects 34 displayed on the display unit 25. The elapse determination unit 62 determines whether or not the reference display time period has elapsed since a measurement start timing for each of the message objects 34. The measurement start timing may be a display start timing of the message object 34, or may be a time point before and after the display start timing.

The measurement start timing is exemplified as follows, but the following timings are merely examples, and the measurement start timing is not limited thereto. Information indicating any one of the following timings is stored in the data storage unit 50 in advance, and the elapse determination unit 62 determines whether or not the reference display time period has elapsed since the time indicated by the above-mentioned information. In the following cases (2) to (4), it is assumed that the information indicating each timing is generated by the message display control server 10, and that the transmission/reception unit 70 receives the above-mentioned information.

(1) Timing at which the user inputs a message
(2) Timing at which the message display control server 10 receives a message input notification from the message display control device 20
(3) Timing at which the data generation unit 54 generates message data
(4) Timing at which the message display control server 10 transmits message data to the message display control device 20
(5) Timing at which the message display control device 20 receives message data
(6) Timing at which the message display control device 20 displays the message object 34
(7) Timing after a predetermined time period has elapsed since the message object 34 started being displayed The elapse determination result acquisition unit 64 is configured to acquire a determination result made by the elapse determination unit 62. For example, the elapse determination result acquisition unit 64 acquires, from the elapse determination unit 62, a determination result indicating that the reference display time period has not elapsed or a determination result indicating that the reference display time period has elapsed.

[Necessity Determination Unit and Necessity Determination Result Acquisition Unit]

The following processing conducted by the necessity determination unit 66 and the necessity determination result acquisition unit 68 is executed by the control unit 21. The necessity determination unit 66 is configured to determine, in order to display a new message object 34 on the display unit 25, whether or not it is necessary to use at least a part of a display region of the at least one of the plurality of message objects 34 displayed on the display unit 25. The necessity determination unit 66 conducts the determination based on the size of the new message object 34 and a region in which no message objects 34 are displayed within the displayable region 38 (this region is hereinafter referred to also as "free region").

More specifically, the necessity determination unit 66 determines whether or not it is possible to display a new message object 34 so as to prevent the new message object 34 from overlapping with the message object 34 displayed on the display unit 25. When such display is not possible, the necessity determination unit 66 determines that it is necessary to use at least a part of the display region of the message object 34 displayed on the display unit 25.

In other words, the necessity determination unit 66 determines whether or not it is possible to display a new message object 34 so as to prevent the display of the message object 34 displayed on the display unit 25 from being restricted (being hidden or disappearing). When such display is not possible, the necessity determination unit 66 determines that it is necessary to use at least a part of the display region of the message object 34 displayed on the display unit 25.

The necessity determination result acquisition unit 68 is configured to acquire the determination result made by the necessity determination unit 66. For example, the elapse determination result acquisition unit 64 acquires, from the elapse determination unit 62, information indicating that it is not necessary to use at least a part of the display region of the message object 34 or information indicating that it is necessary to use at least a part of the display region of the message object 34.

[Transmission/Reception Unit]

The following processing conducted by the transmission/reception unit 70 is executed by the control unit 21, and more specifically, is executed when the control unit 21 transmits an instruction to the communication unit 23. The transmission/reception unit 70 is configured to transmit and receive various kinds of data to and from the transmission/reception unit 52 of the message display control server 10. In this embodiment, the transmission/reception unit 70 receives the message data generated by the data generation unit 54 of the message display control server 10 through the transmission/reception unit 52. The message data received by the transmission/reception unit 70 is recorded on the data storage unit 60.

Further, the transmission/reception unit 70 transmits, to the message display control server 10, a message input notification indicating that a message has been input. The message input notification indicates that a message has been input at a transmission source thereof, and is issued through the transmission of data having a format defined in advance. In this case, the transmission source represents the message display control device 20 that has received the input of the message and the transmission operation (message display control device 20 of the user having conducted the transmission operation).

The message input notification includes the message input into the input form 40 and information for identifying the inputter (for example, information for identifying the user or information for identifying the message display control device 20). When the send button 42 is selected with the message having been input into the input form 40 on the message display control device 20 of each user, the message input notification is transmitted from the message display control device 20.

[Display Control Unit]

The following processing conducted by the display control unit 72 is executed by the control unit 21, and more specifically, is executed when the control unit 21 transmits an instruction to the display unit 25. The display control unit 72 is configured to display the message object 34 based on the message data. The display control unit 72 conducts control for displaying a new message object 34 on the display unit 25, on which the at least one of the plurality of message objects 34 are displayed, based on the determination result acquired by the elapse determination result acquisition unit 64. The control for displaying the new message object 34 represents displaying of the new message object 34 so as not to restrict the display of the message object 34 that has not been displayed for the reference display time period.

For example, the display control unit 72 displays the new message object 34 on the display unit 25 through use of at least a part of the display region of the message object 34 that has been displayed for the reference display time period. The display region of the message object 34 represents a region in which the message object 34 is displayed.

Further, the displaying of the new message object 34 through the use of at least a part of the display region of the message object 34 that has been displayed for the reference display time period means displaying of the new message object 34 through direct or indirect use of at least a part of the display region of the message object 34 that has been displayed for the reference display time period. In this embodiment, a case of the direct use is described, and a case of the indirect use is described later in a modification example of the present invention.

The direct use of at least a part of the display region of the message object 34 that has been displayed for the reference display time period means the displaying of the new message object 34 in at least a part of the display region of the message object 34 that has been displayed for the reference display time period. In other words, the direct use means the displaying of the new message object 34 in at least a part of the region in which the message object 34 that has been displayed for the reference display time period is being displayed or a region in which the above-mentioned message object 34 was displayed. For example, the displaying of the new message object 34 in the following manner by the display control unit 72 corresponds to the direct use of at least a part of the display region of the message object 34 that has been displayed for the reference display time period. (1) The display control unit 72 displays the new message object 34 so as to superimpose at least a part of the new message object 34 on at least a part of the message object 34 that has been displayed for the reference display time period. (2) The display control unit 72 displays at least a part of the new message object 34 so as to be overwritten onto at least a part of the message object 34 that has been displayed for the reference display time period. (3) The display control unit 72 erases at least a part of the message object 34 that has been displayed for the reference display time period, and displays the new message object 34 through use of a region in which the at least a part was displayed. For example, the display control unit 72 displays the new message object 34 so as to display at least a part of the new message object 34 in the region in which the at least a part was displayed.

In this embodiment, the display control unit 72 displays the new message object 34 through the use of at least a part of the display region of the message object 34 that has been displayed for the reference display time period when the necessity determination unit 66 determines that it is necessary to use the at least a part of the display region. Meanwhile, when the necessity determination unit 66 determines that it is not necessary to use the at least a part of the display region, the display control unit 72 displays the new message object 34 without the use of the display region of the message object 34 that has been displayed for the reference display time period.

In this embodiment, the display control unit 72 displays the new message object 34 so as to be superimposed on at least a part of the message object 34 that has been displayed for the reference display time period. That is, the display control unit 72 superimposes a part or an entirety of the new message object 34 on a part or the entirety of the message object 34 that has been displayed for the reference display time period. The superimposing on at least a part of the message object 34 that has been displayed for the reference display time period means that a common part exists between the display region of the message object 34 that has been displayed for the reference display time period and the display region of the new message object 34. More specifically, the superimposing means that, when the message object 34 is displayed through use of a layer function of a two-dimensional image, the new message object 34 is set to be overlaid on the front side of the message object 34 that has been displayed for the reference display time period with a higher priority (in overlapping order) than a priority (in overlapping order) of the message object 34 that has been displayed for the reference display time period, and means that, when the message object 34 is displayed three-dimensionally, the new message object 34 is arranged in a three-dimensional space between a viewpoint (virtual camera) and the message object 34 that has been displayed for the reference display time period.

For example, when the plurality of message objects 34 displayed on the display unit 25 include a plurality of message objects 34 that have been displayed for the reference display time period, the display control unit 72 displays the new message object 34 through use of at least a part of the display region of the message object 34 that has been displayed for the longest time period after the elapse of the reference display time period among a plurality of message objects 34 that have been displayed for the reference display time period. The time period after the elapse of the reference display time period represents a time period that has elapsed since the elapse of the reference display time period, and represents a time interval between a time point at which the reference display time period has elapsed and the current time point.

When the at least one of the plurality of message objects 34 displayed on the display unit 25 include no message objects 34 that have been displayed for the reference display time period, the display control unit 72 displays the new message object 34 through use of at least a part of the display region of the message object 34 that has the shortest remaining time period until the elapse of the reference display time period among the at least one of the plurality of message objects 34 displayed on the display unit 25. The remaining time period until the elapse of the reference display time period represents a time period required until the reference display time period has elapsed, and represents a time interval between the current time point and a time point at which the reference display time period is to have elapsed.

Further, the display control unit 72 erases the at least one of the plurality of message objects 34 displayed on the display unit 25 when a display time limit for each of the at least one of the plurality of message objects 34 is reached. The display time limit represents a time point to be reached after the elapse of the reference display time period. The display time limit is a timing to erase the message object 34, and differs from the reference display time period. That is, the display time limit can be said to be a time required for confirming the message object 34 with sufficient time to spare, and the reference display time period can be said to be the shortest time period to be ensured in order to confirm the message object 34. In other words, the display time limit and the reference display time period are set for different purposes. The display time limit is set in order to erase the message object 34 that is unnecessary from the viewpoint of visibility of the entire game screen 30, and the reference display time period is set in order to ensure the shortest time period required for the user's confirmation. The message object 34 keeps being displayed even after the reference display time period has elapsed, and when the display time limit is reached, the message object 34 stops being displayed. The display time limit may be common to all the messages, or may differ depending on the message. For example, the display time limit may change depending on the length of the message represented by the message object 34, or may be variable based on the user's setting or the situation of the game (for example, may differ for each user, or may change depending on whether or not the situation of the game is a predetermined situation).

Further, in this embodiment, the display control unit 72 displays the message object 34 and the avatar image 36 in association with each other. The displaying of the message object 34 in association with the avatar image 36 means that the message object 34 and the avatar image 36 are displayed so that the user can grasp an association therebetween. Specifically, the displaying of the message object 34 so that a part of the message object 34 points at the avatar image 36 corresponds to the "displaying of the message object 34 in association with the avatar image 36". Further, for example, the displaying of the message object 34 with a display position of at least a part of the message object 34 (tail of a balloon) being set based on the position of the avatar image 36 corresponds to an example of the "displaying of the message object 34 in association with the avatar image 36". Further, for example, the displaying of at least a part of the message object 34 in a vicinity of (in a position within a predetermined distance from) the avatar image 36 corresponds to an example of the "displaying of the message object 34 in association with the avatar image 36".

4. Processing Executed by Message Display Control System

Figure 8:
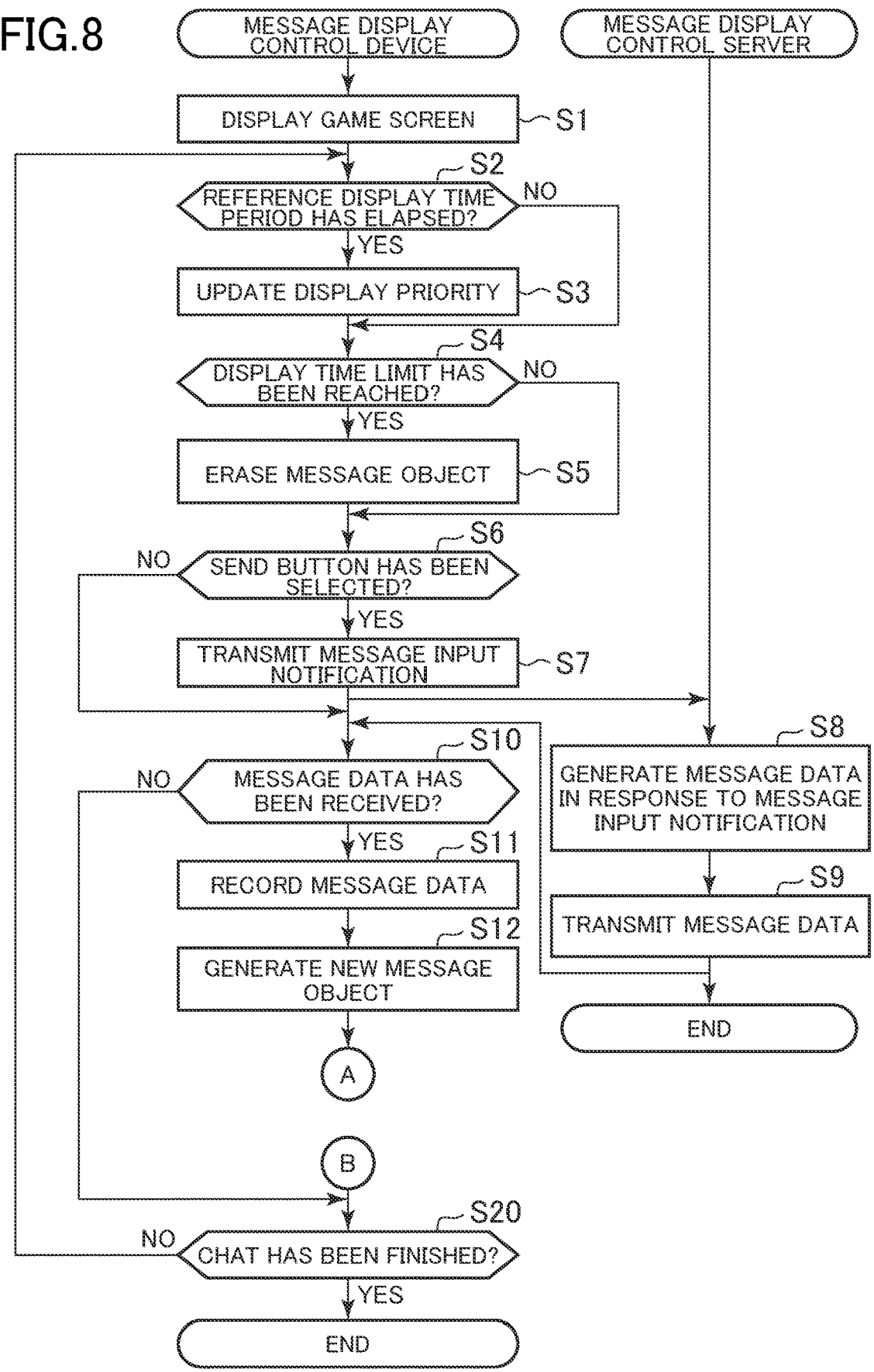
FIG. 8 is a flowchart for illustrating processing executed by the message display control system.
Figure 9:
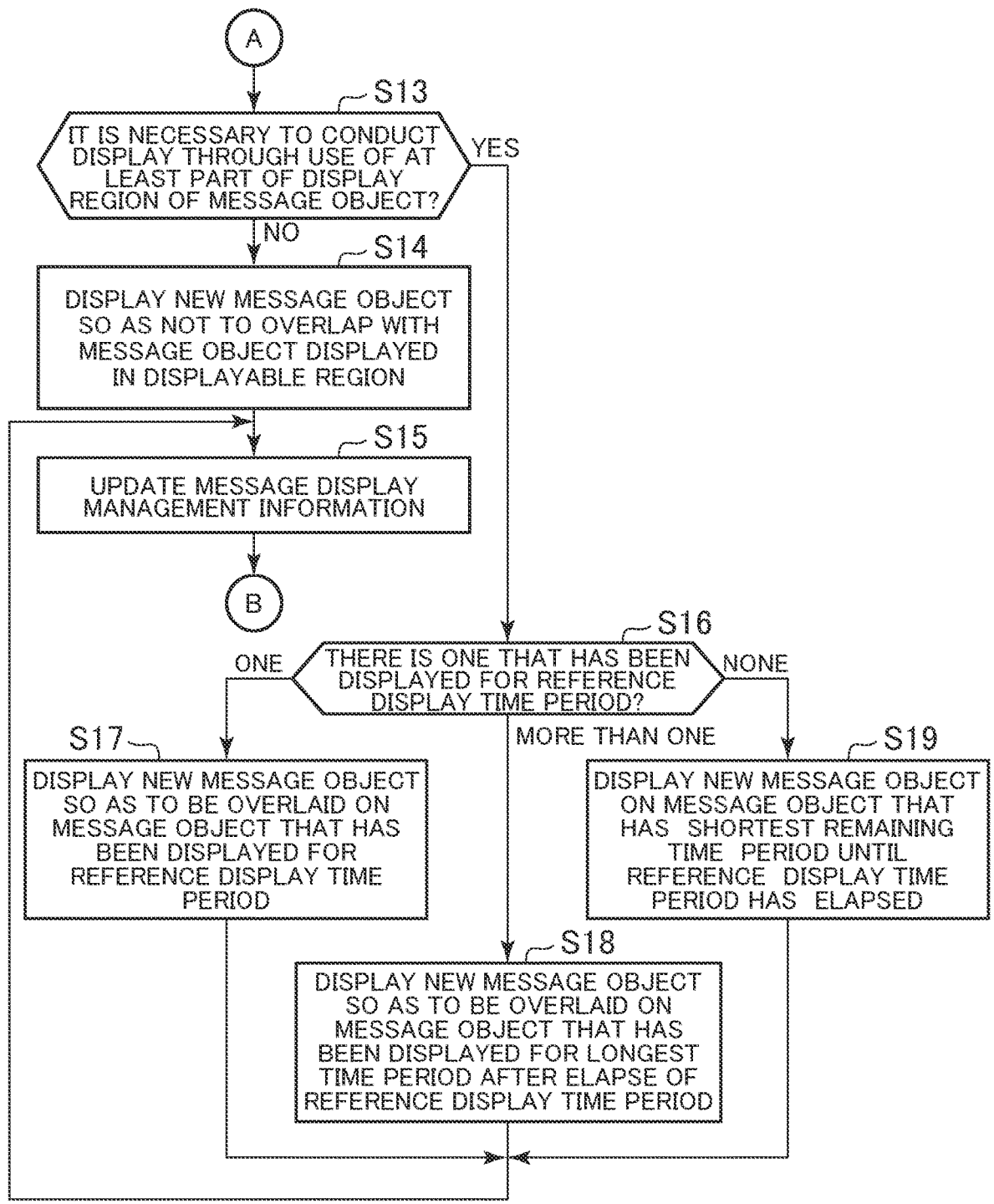
FIG. 9 is a flowchart for illustrating the processing executed by the message display control system.

FIG. 8 and FIG. 9 are flowcharts for illustrating processing executed by the message display control system 1. When a chat joined by a plurality of users starts, the processing illustrated in FIG. 8 and FIG. 9 is executed by the control unit 11 operating in accordance with a program stored on the storage unit 12 and by the control unit 21 operating in accordance with a program stored on the storage unit 22. The processing described below is executed, to thereby achieve the functional blocks illustrated in FIG. 5. In FIG. 8 and FIG. 9, only one message display control device 20 is illustrated for the sake of brevity, but the same processing is executed on the respective message display control devices 20.

First, as illustrated in FIG. 8, on the message display control device 20, the control unit 21 displays the game screen 30 on the display unit 25 (S1). The game screen 30 displayed in Step S1 is an initial screen, and hence the message object 34 is not displayed yet. In this embodiment, a chat is conducted during execution of a game, and hence the game is assumed to be progressing as well based on operations of the respective users.

The control unit 21 determines whether or not the reference display time period has elapsed for each of the message objects 34 displayed in the displayable region 38 (S2). In Step S2, the control unit 21 determines, for each of the message objects 34 having the display priority of "1", whether or not a time point has been reached at which the reference display time period has elapsed since a display start time. When the message object 34 is not being displayed in the displayable region 38, the processing of Step S2 to Step S5 is not executed.

When it is determined that the reference display time period has elapsed (Y in S2), the control unit 21 updates the display priority of the message object 34 that has been displayed for the reference display time period (S3). In Step S3, the control unit 21 changes the display priority of the message object 34 that has been displayed for the reference display time period from "1" to "0".

Meanwhile, when it is not determined that the reference display time period has elapsed (N in S2), the control unit 21 determines whether or not the display time limit has been reached for each of the message objects 34 displayed in the displayable region 38 (S4). In Step S4, the control unit 21 determines whether or not the display time limit set to a predetermined time period after the display start time has been reached for each of the message objects 34 displayed on the display unit 25.

When it is determined that the display time limit has been reached (Y in S4), the control unit 21 erases the message object 34 that has reached the display time limit (S5). In Step S5, the control unit 21 deletes, from the message display management information, a record corresponding to the message object 34 to be erased. As a result, the message object 34 is erased from the display unit 25.

Meanwhile, when it is determined that the display time limit has not been reached (N in S4), the control unit 21 determines whether or not the send button 42 has been selected with a message having been input into the input form 40 (S6). The user can transmit a message by operating the operation unit 24 to input the symbol string and the image into the input form 40 and to select the send button 42. The send button 42 may be inhibited from being selected with no message having been input into the input form 40.

When it is determined that the send button 42 has been selected (Y in S6), the control unit 21 transmits the message input notification to the message display control server 10 (S3). When the notification is transmitted from each message display control device 20 to the message display control server 10, the user ID (information for identifying the message display control device 20, the user operating the message display control device 20, or the like) and others are also transmitted, and the message display control server 10 can identify which message display control device 20 or which user the notification has been received from.

When the message display control server 10 receives the message input notification, the control unit 11 generates message data in response to the message input notification (S8). In Step S8, a new message ID is issued to the message indicated by the message input notification, and the message is stored in the message database after the message ID is associated with the inputter information, the reference display time period, and the current time. The message ID may be issued based on predetermined ID issuing rules so as to avoid a conflict with another message ID. Further, this embodiment is described by taking a case where the message is associated with the current time, but the message may be associated with a time at which the message was recorded on the message display control device 20 at a time of the input of the message. The above-mentioned time is acquired on the message display control device 20, and is included in the message input notification.

The control unit 11 transmits the message data generated in Step S8 to each message display control device 20 (S9). The information (for example, IP address) for identifying the message display control device 20 of each user having joined the chat is stored in the storage unit 12 in advance, and the message display control server 10 can identify the transmission destination of the message data.

On the message display control device 20, the control unit 21 determines whether or not the message data has been received from the message display control server 10 (S10). When it is determined that the message data has been received (Y in S10), the control unit 21 records the received message data on the storage unit 22 (S11).

The control unit 21 generates a new message object 34 based on the received message data (S12). In Step S12, the control unit 21 generates the message object 34 representing the message indicated by the message data. Image data for generating the message object 34 is assumed to be stored in advance on the storage unit 22. For example, the control unit 21 generates the message object 34 by changing the size of the image indicated by the image data depending on the length of the message indicated by the message data and embedding the message into the changed image. The control unit 21 temporarily records, on the storage unit 22, the image data on the message object 34 generated in Step S12.

Next in FIG. 9, the control unit 21 determines whether or not it is necessary to display the new message object 34 generated in Step S12 through the use of at least a part of the display region of the message object 34 displayed in the displayable region 38 (S13). In Step S13, the control unit 21 refers to the display coordinates of each of the message objects 34 indicated by the message display management information to determine whether or not the new message object 34 generated in Step S12 can be displayed without an overlap with another message object 34 displayed in the displayable region 38.

When it is determined that it is not necessary to use the at least a part of the display region (N in S13), the control unit 21 displays the new message object 34 generated in Step S12 so as not to overlap with the message object 34 displayed in the displayable region 38 (S14), and updates the message display management information (S15). In Step S15, the control unit 21 stores the message ID of the message represented by the new message object 34, the current time, and coordinates at which the new message object 34 is displayed, in the message display management information in association with one another. The new message object 34 has just started being displayed and has not been displayed for the reference display time period, and therefore exhibits the display priority of "1".

Meanwhile, when it is determined that it is necessary to use the at least a part of the display region (Y in S13), the control unit 21 determines whether or not there is a message object 34 that has been displayed for the reference display time period among the message objects 34 displayed in the displayable region 38 (S16). In Step S16, the control unit 21 refers to the value of the display priority of each record stored in the message display management information.

When it is determined that there is one message object 34 that has been displayed for the reference display time period (ONE in S16), the control unit 21 displays the new message object 34 so as to be overlaid on the message object 34 that has been displayed for the reference display time period (S17). In Step S17, the control unit 21 may display the new message object 34 so as to overlap with only a part of the message object 34 that has been displayed for the reference display time period, or may display the new message object 34 so as to overlap with the entirety of the message object 34 that has been displayed for the reference display time period.

Meanwhile, when it is determined that there are a plurality of message objects 34 that have been displayed for the reference display time period (MORE THAN ONE in S16), the control unit 21 displays the new message object 34 so as to be overlaid on the message object 34 that has been displayed for the longest time period after the elapse of the reference display time period among the plurality of message objects 34 that have been displayed for the reference display time period (S18). In Step S18, the control unit 21 calculates a time period that has elapsed since the elapse of the reference display time period for each message object 34 that has the value "0" of the display priority. Then, the control unit 21 overlays the new message object 34 on the message object 34 that has been displayed for the longest time period that has been calculated.

Meanwhile, when it is determined that there is no message objects 34 that have been displayed for the reference display time period (NONE in S16), the control unit 21 displays the new message object 34 on the message object 34 having the shortest remaining time period until the reference display time period has elapsed (S19). In Step S19, for each message object 34 that has the value "1" of the display priority, the control unit 21 calculates the remaining time period until the reference display time period has elapsed. Then, the control unit 21 overlays the new message object 34 on the message object 34 having the shortest remaining time period that has been calculated. After the processing of any one of Step S17 to Step S19 is executed, the control unit 21 advances to Step S15 to update the message display management information based on the display coordinates of the message object 34 and the current time.

Returning to FIG. 8, the control unit 21 determines whether or not the chat has been finished (S20). The chat is finished when the condition defined in advance is satisfied, and for example, is finished when any one of the users conducts a predetermined operation for finishing the chat or when the game is cleared. When it is not determined that the chat has been finished (N in S20), the procedure returns to the processing of Step S2. Meanwhile, when it is determined that the chat has been finished (Y in S20), this processing is brought to an end.

According to the message display control system 1 described above, the control for displaying the new message object 34 based on the determination result as to whether or not the reference display time period has elapsed is conducted for each message object 34, and hence it is possible to ensure a time period to confirm each message object 34. In particular, when a chat is conducted during the game, it is necessary to conduct various operations relating to the game and to confirm the game image 32, and hence it is sometimes impossible to immediately confirm the message object 34. In this respect, the shortest time period required for the display of each message object 34 so as to prevent the each message object 34 from being hidden by another message object 34 is set as the reference display time period, to thereby allow the message object 34 to be confirmed while operations for the game are conducted and the game image 32 is confirmed. In addition, when the message object 34 and the avatar image 36 are displayed in association with each other, the respective message objects 34 are likely to overlap with each other due to constraints added to the display position of the message objects 34, but the reference display time period is set as described above, to thereby be able to ensure a time period for the confirmation even in a situation in which the respective message objects 34 are likely to overlap with each other.

Further, when the new message object 34 is displayed, it is not necessary to use the display region of the message object 34 that has not been displayed for the reference display time period, and hence it is possible to ensure the time period for confirming the message object 34 that has not been displayed for the reference display time period. More specifically, the new message object 34 is displayed so as to be superimposed on at least a part of the message object 34 that has been displayed for the reference display time period, to thereby be able to ensure the time period for displaying the message object 34 that has not been displayed for the reference display time period.

Further, when it is necessary to use the display region of the message object 34 that has already been displayed in order to display the new message object 34, the new message object 34 is displayed through the use of at least a part of the display region of the message object 34 that has been displayed for the reference display time period. Therefore, when it is not necessary to use the display region of the message object 34 that has already been displayed, even the message object 34 that has been displayed for the reference time period is allowed to keep being displayed for a long time period as it is because its display region does not need to be used.

Further, the message object 34 that has been displayed for a longer time period after the elapse of the reference display time period is more likely to have been confirmed, while the message object 34 that has been displayed for a shorter time period after the elapse of the reference display time period is less likely to have been confirmed. Therefore, at least apart of the display region of the message object 34 that has been displayed for the above-mentioned time period that is the longest is used to display the new message object 34, to thereby be able to ensure the time period for confirming the message object 34 that is relatively less likely to have been confirmed.

Further, the message object 34 having a shorter remaining time period until the elapse of the reference display time period is more likely to have been confirmed, while the message object 34 having a longer remaining time period until the elapse of the reference display time period is less likely to have been confirmed. Therefore, at least a part of the display region of the message object 34 having the shortest remaining time period is used to display the new message object 34, to thereby be able to ensure the time period for confirming the message object 34 that is less likely to have been confirmed.

5. Modification Examples

The present invention is not limited to the embodiment described above, and can be modified suitably without departing from the spirit of the present invention.

Figure 10:
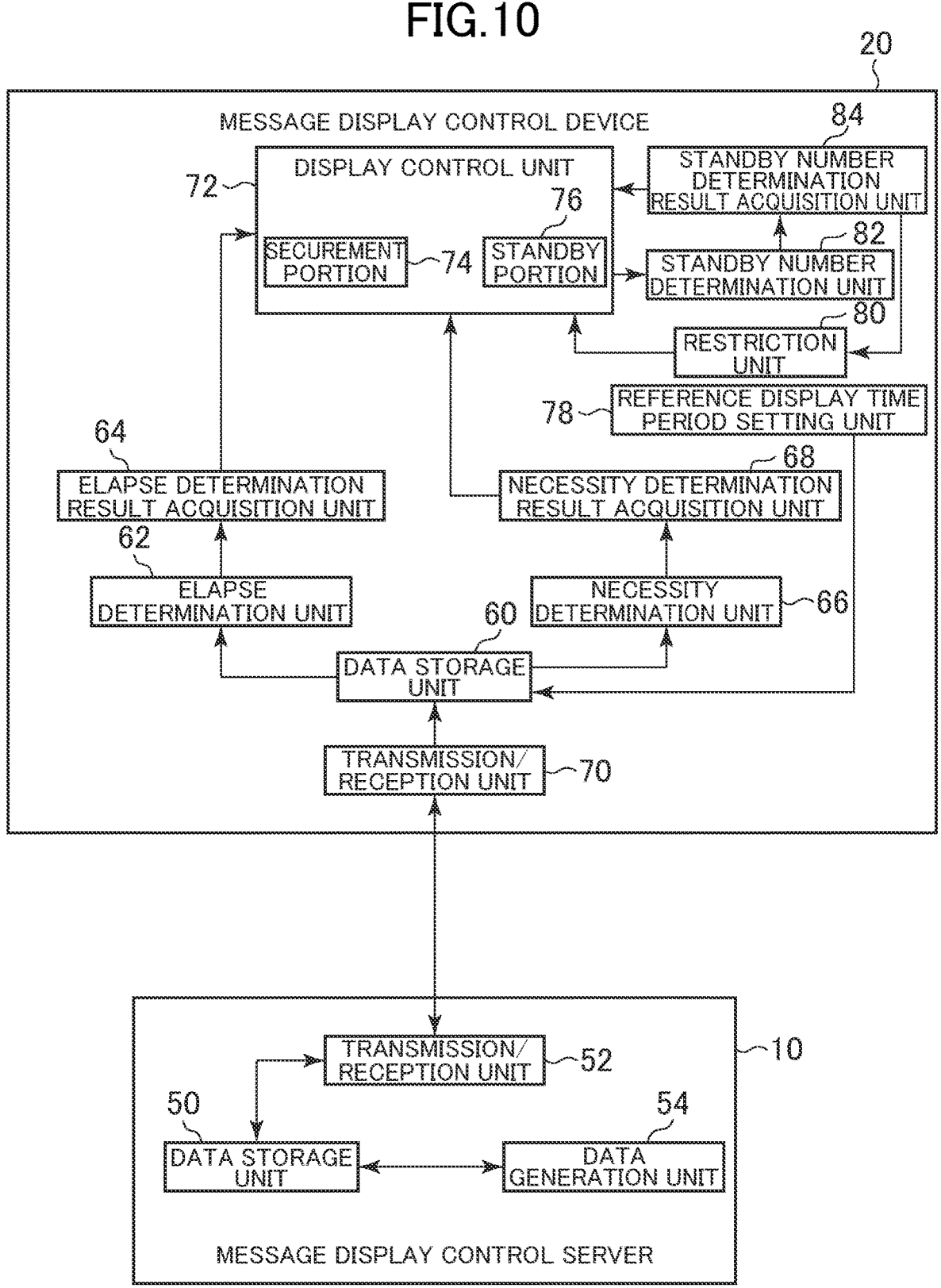
FIG. 10 is a functional block diagram of modification examples of the present invention.

FIG. 10 is a functional block diagram of the modification example. As illustrated in FIG. 10, in the modification example, a securement portion 74 and a standby portion 76 are achieved in the display control unit 72. Further, in the modification example, in addition to the functions of the embodiment, a reference display time period setting unit 78, a restriction unit 80, a standby number determination unit 82, and a standby number determination result acquisition unit 84 are achieved. Those functions are achieved mainly by the control unit 21. The securement portion 74 is a component essential to Modification Example (3-1) to Modification Example (3-5) of the present invention, but may be omitted in the other modification examples. The standby portion 76 is a component essential to Modification Example (5-1) and Modification Example (5-2) of the present invention, but may be omitted in the other modification examples. The reference display time period setting unit 78 is a component essential to Modification Example (4) of the present invention, but may be omitted in the other modification examples. The restriction unit 80 is a component essential to Modification Example (5-2) and Modification Example (6) of the present invention, but may be omitted in the other modification examples. The standby number determination unit 82 and the standby number determination result acquisition unit 84 are components essential to Modification Example (5-2), but may be omitted in the other modification examples.

(1-1) For example, in the embodiment, the user is not allowed to confirm a part of the message object 34 that has been displayed for the reference display time period, which overlaps with a new message object 34, but the display control unit 72 may display at least a part of the above-mentioned message object 34 and at least a part of the new message object 34 in at least a part of the display region of the message object 34 that has been displayed for the reference display time period.

The displaying of at least a part of the message object 34 that has been displayed for the reference display time period and at least apart of the new message object 34 means the displaying of both of the at least a part of the message object 34 that has been displayed for the reference display time period and the at least a part of the new message object 34 within a given region. In other words, the user is allowed to confirm, within a given region, at least a part of the message represented by the message object 34 that has been displayed for the reference display time period and at least a part of the message represented by the new message object 34.

Now, a description is made of a case where the display control unit 72 translucently displays the new message object 34 so as to be superimposed on at least a part of the message object 34 that has been displayed for the reference display time period. For example, the display control unit 72 causes the new message object 34 to become translucent, to thereby enable the user to confirm the part of the message object 34 that has been displayed for the reference display time period, which overlaps with the new message object 34.

Figure 11:
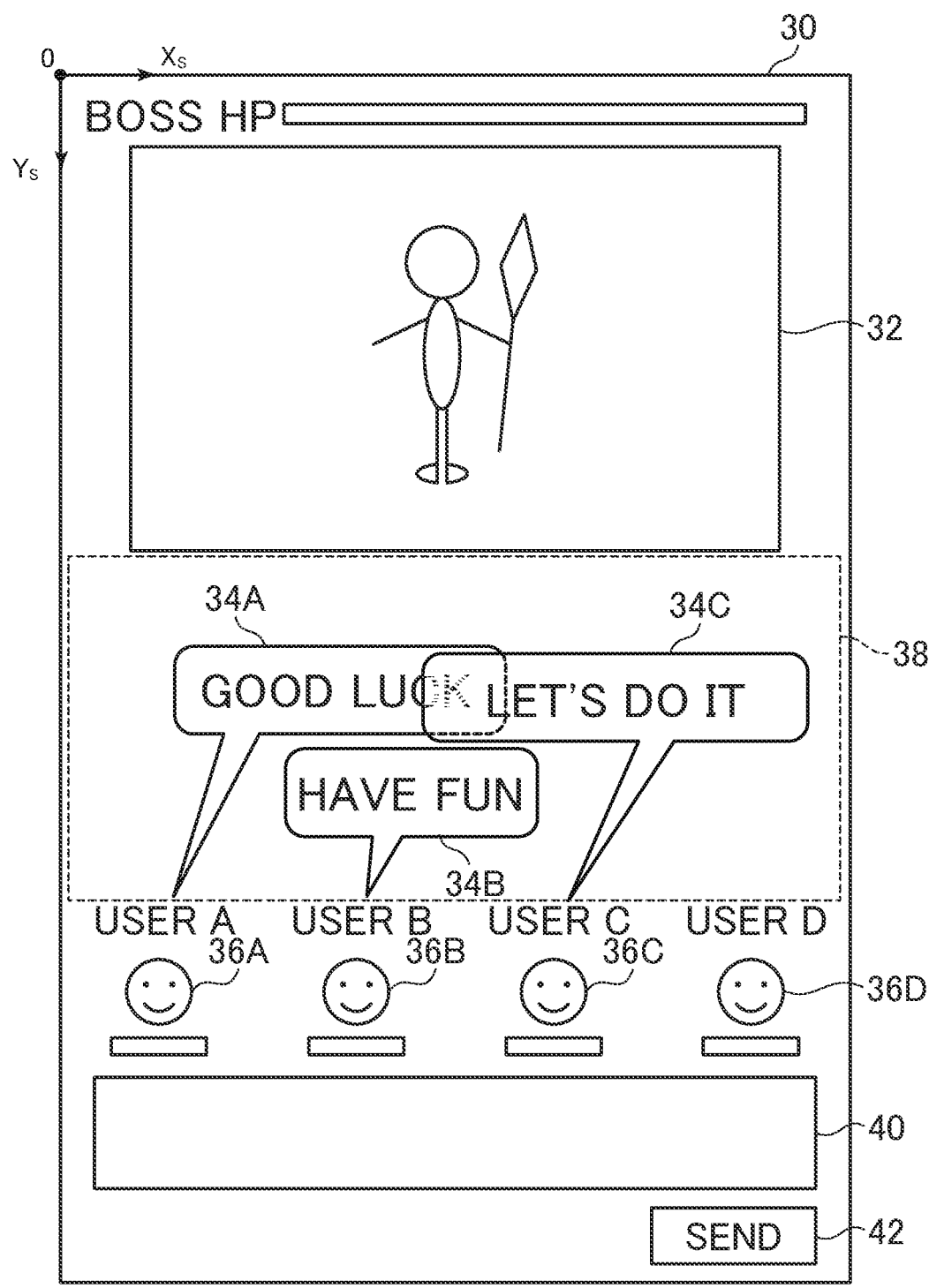
FIG. 11 is a diagram for illustrating an example of a game screen according to Modification Example (1-1) of the present invention.

FIG. 11 is a diagram for illustrating an example of the game screen 30 according to Modification Example (1-1) of the present invention. As illustrated in FIG. 11, the display control unit 72 causes a new message object 34C to become translucent by changing a transparency of the new message object 34C, to thereby be able to display a part (in FIG. 11, schematically indicated by the broken lines) of the message object 34A that overlaps with the message object 34C. In other words, the display control unit 72 translucently composites the message objects 34A and 34C, to thereby enable both of those message objects 34A and 34C to be confirmed.

The display control unit 72 may be configured to gradually lower the transparency of the new message object 34C with the elapse of time after displaying the new message object 34C. That is, the display control unit 72 causes the new message object 34C to become translucent with a predetermined transparency immediately after the start of the display, and changes the transparency of the new message object 34C so that the new message object 34C becomes less translucent with the elapse of time. With this configuration, the new message object 34C can be made more visible with the elapse of time because it is difficult to view the new message object 34C being kept translucent.

Further, in contrast to the above-mentioned configuration, the display control unit 72 may be configured to inhibit the new message object 34C from being displayed translucently at a time point of the start of the display, and to gradually raise the transparency of the new message object 34C with the elapse of time. That is, the display control unit 72 inhibits the new message object 34C from becoming translucent immediately after the start of the display, and changes the transparency of the new message object 34C so that the message object 34C becomes more translucent with the elapse of time. With this configuration, the new message object 34C is in a relatively visible state immediately after the start of the display, and causes the new message object 34C to become more translucent with the elapse of time, to thereby be able to allow the message object 34A to be confirmed as well.

Further, when the processing of Step S19 is executed, the new message object 34C may be translucently displayed. That is, the display control unit 72 may be configured to cause the new message object 34C to become translucent when neither the message object 34A nor the message object 34B has been displayed for the reference display time period. This allows the user to confirm all the message objects 34A to 34C. After that, when one of the message objects 34A and 34B that overlaps with the message object 34C has been displayed for the reference display time period, the display control unit 72 may cancel the translucent state of the message object 34C to inhibit the message object 34C from becoming translucent.

According to Modification Example (1-1), it is possible to allow the message object 34A that has been displayed for the reference display time period to be confirmed as well while allowing the new message object 34C to be confirmed.

A method of displaying at least apart of the message object 34A and at least apart of the new message object 34C in at least a part of the display region of the message object 34A that has been displayed for the reference display time period is not limited to the above-mentioned mode of causing the new message object 34C to become translucent (method involving image compositing). In addition, for example, the display control unit 72 may be configured to conduct the display control so that a region for displaying only the message object 34A and a region for displaying only the message object 34C exist in at least apart of the display region of the message object 34A that has been displayed for the reference display time period (for example, part in which the message objects 34A and 34C overlap with each other, which is illustrated in FIG. 11). For example, the display control unit 72 may be configured to conduct the display control so that the region for displaying only the message object 34A and the region for displaying only the message object 34C are arranged alternately (for example, so that the two images are displayed alternately through use of a predetermined pattern, for example, mesh pattern or texture pattern).

(1-2) Further, for example, in the embodiment, the new message object 34 is overlaid while the message object 34 that has been displayed for the reference display time period keeps being displayed, but the display control unit 72 may be configured to erase at least a part of the message object 34 that has been displayed for the reference display time period, and to display the new message object 34 through use of a region in which the at least a part was displayed.

Figure 12:
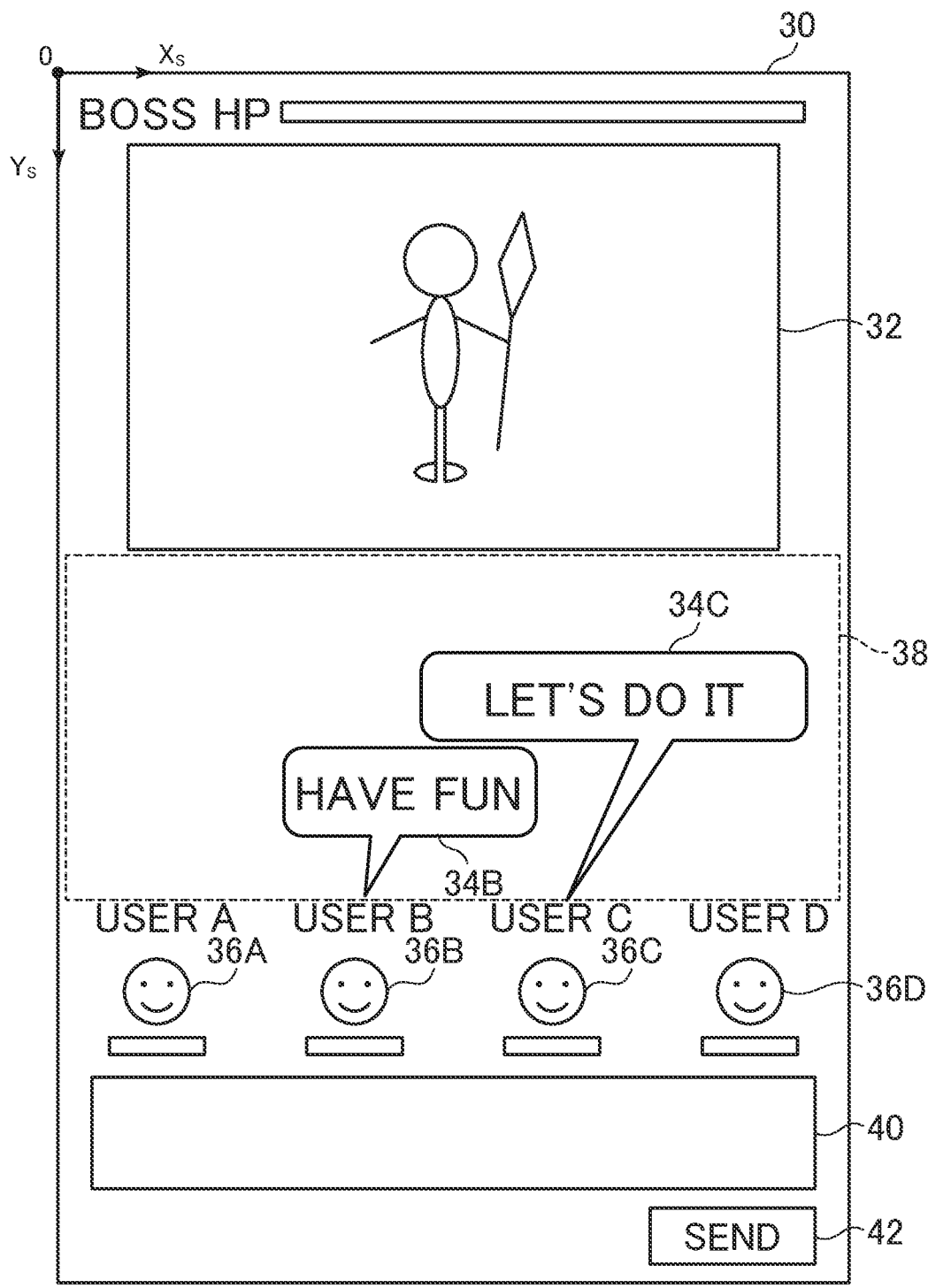
FIG. 12 is a diagram for illustrating display control according to Modification Example (1-2) of the present invention.

FIG. 12 is a diagram for illustrating the display control according to Modification Example (1-2) of the present invention. In the example illustrated in FIG. 12, the display control unit 72 erases the entirety of the message object 34A, and displays apart of the new message object 34C through the use of the region in which the at least a part was displayed.

In FIG. 12, the case of erasing the entirety of the message object 34A is described, but the display control unit 72 may be configured to erase apart of the message object 34A, and to display a part or an entirety of the new message object 34 through the use of the region in which the message object 34A was displayed. In this case, the game screen 30 exhibits the same screen as that of FIG. 4. The message object 34A is brought to a state in which a part thereof overlapping with the message object 34C is cut away. A region in which the other part of the message object 34C is displayed is a region in which neither the another message object 34A nor the message object 34B has been displayed from the beginning.

According to Modification Example (1-2), at least a part of the message object 34 that has been displayed for the reference display time period is erased, and a region of the at least a part is used to display the new message object 34. Therefore, the image that is highly likely to have been confirmed by the user is no longer displayed, which eliminates wastefulness, and it is possible to ensure the time period for displaying the message object 34 that has not been displayed for the reference display time period.

(2) Further, for example, when the plurality of message objects 34 displayed on the display unit 25 include a plurality of message objects 34 that have been displayed for the reference display time period, the display control unit 72 may be configured to display the new message object 34 through the use of at least a part of the display region of the message object 34 having the shortest remaining time period until the display time limit is reached among the plurality of message objects 34 that have been displayed for the reference display time period. The remaining time period until the display time limit is reached represents a time period required until the display time limit is reached, and represents a time interval between the current time point and the display time limit.

Figure 13:
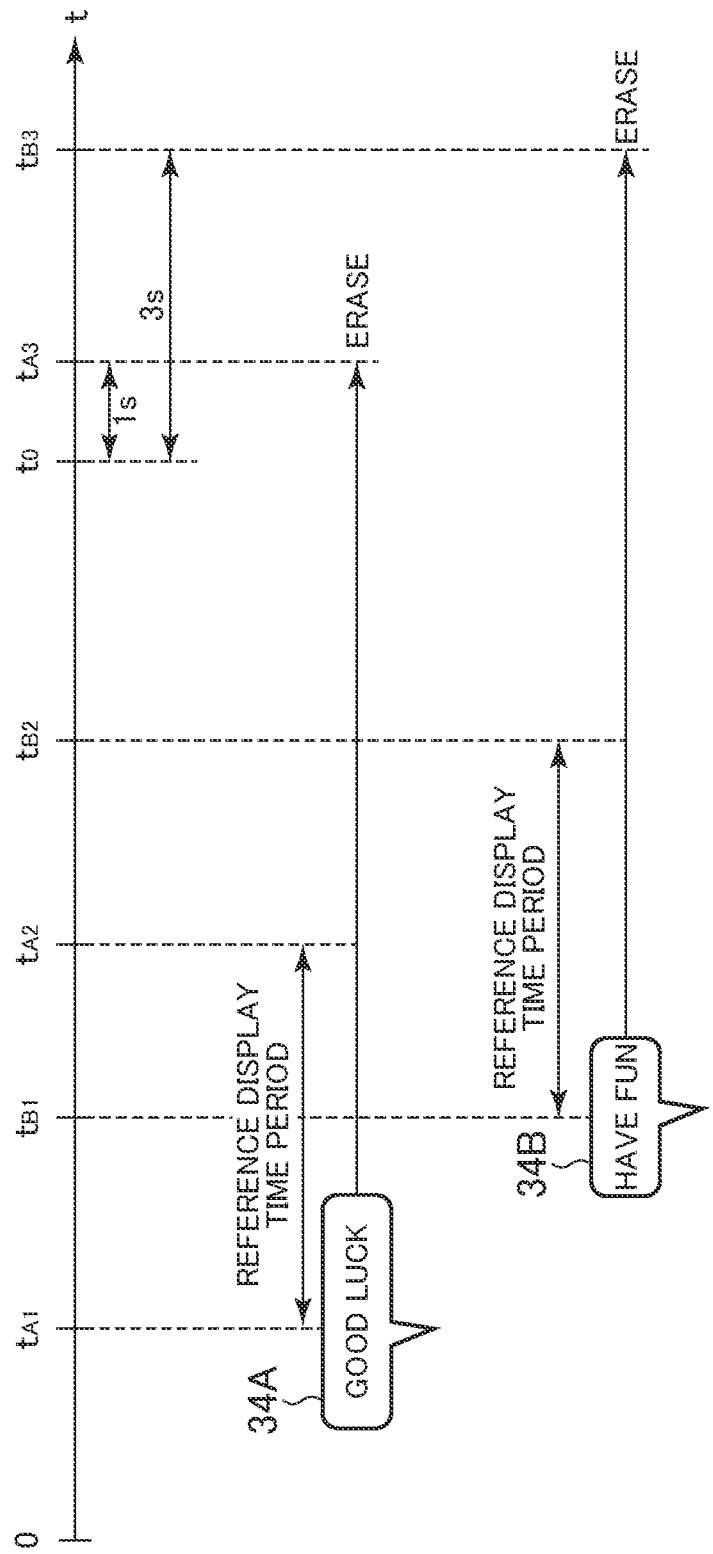
FIG. 13 is an explanatory diagram of display control according to Modification Example (2) of the present invention.

FIG. 13 is an explanatory diagram of display control according to Modification Example (2) of the present invention. A t-axis illustrated in FIG. 13 is a time axis. A time $t_0$ is the current time, and times $t_{A1}$, $t_{A2}$, and $t_{A3}$ are a time at which the message object 34A starts being displayed, a time at which the reference display time period for the message object 34A has elapsed, and a time at which the display time limit for the message object 34A is reached, respectively. In the same manner, times $t_{B1}$, $t_{B2}$, and $t_{B3}$ are a time at which the message object 34B starts being displayed, a time at which the reference display time period for the message object 34B has elapsed, and a time at which the display time limit for the message object 34B is reached, respectively.

In the example illustrated in FIG. 13, the message objects 34A and 34B have both been displayed for the reference display time period, and exhibit the remaining time periods (time interval between time $t_0$ and time $t_{A3}$ or time $t_{B3}$) of 1 second and 3 seconds, respectively, until the display time limit, and hence the message object 34A has the shortest remaining time period. Therefore, the display control unit 72 displays the new message object 34C through the use of at least a part of the display region of the message object 34A having the shortest remaining time period. The method itself of using the display region of the message object 34A is the same as the method described in the embodiment.

According to Modification Example (2), the message object 34, which has a shorter remaining time period until the display time limit is reached, and is soon to be erased, is highly likely to have been confirmed by the user, while the message object 34, which exhibits a longer remaining time period until the display time limit is reached, and which is not yet to be erased, is less likely to have been confirmed by the user. Therefore, the new message object 34 is displayed through the use of at least a part of the display region of the message object 34 having the shortest remaining time period, to thereby be able to ensure the time period for confirming the message object 34 that is relatively less likely to have been confirmed.

(3-1) Further, for example, the display control unit 72 may include the securement portion 74, and the securement portion 74 may be configured to cause a size of the message object 34 that has been displayed for the reference display time period to become smaller than a size of the message object 34 before the reference display time period has elapsed, to thereby expand a region available for displaying the new message object 34. The processing conducted by the securement portion 74 is executed by the control unit 21. The region available for displaying the new message object 34 represents at least one of a region within the displayable region 38 in which no message objects 34 are being displayed and a region within the displayable region 38 in which the message object 34 that has been displayed for the reference display time period is being displayed. For example, in this modification example, the size of the message object 34 that has been displayed for the reference display time period becomes smaller, with the result that the region in which no message objects 34 are being displayed is expanded, and hence the region available for displaying the new message object 34 is expanded.

The size of the message object 34 represents how wide the display region of the message object 34 is, and represents an area of the message object 34 displayed on a screen. The securement portion 74 is configured to reduce the message object 34 that has been displayed for the reference display time period, to thereby expand a region (free region) in which no message objects 34 are being displayed within the displayable region 38. The expanding of the region means increasing (enlarging) of an area thereof. In other words, the securement portion 74 can be said to be configured to secure, generate, or set the region available for displaying the new message object 34.

FIG. 14 is a diagram for illustrating a change of the game screen 30 according to Modification Example (3-1). As illustrated in FIG. 14, the message object 34A has been displayed for the reference display time period, and hence the securement portion 74 causes the size of the message object 34A to become smaller than the size before the reference display time period has elapsed. As a result, the region in which no message objects 34 are being displayed is expanded within the displayable region 38, and hence the display control unit 72 displays the new message object 34C in the expanded region. A ratio (reduction ratio) used by the securement portion 74 when reducing the message object 34 may be a value defined in advance, or may be determined based on the size of the new message object 34C.

The securement portion 74 may be configured to reduce the message object 34A immediately after the elapse of the reference display time period, or to reduce the message object 34A when the new message object 34C is displayed. That is, a timing to reduce the message object 34A may be any timing after the elapse of the reference display time period. This point holds true for Modification Examples (3-2) to (3-5) described later, and a timing to change the shape, orientation, or display position of the message object 34 may be any timing after the elapse of the reference display time period.

According to Modification Example (3-1), the message object 34 that has been displayed for the reference display time period is reduced, while the region available for displaying the new message object 34 is expanded, and hence when the new message object 34 is displayed, there is no need to use the display region of the message object 34 that has not been displayed for the reference display time period, to thereby be able to ensure the time period for confirming the message object 34 that has not been displayed for the reference display time period. Supposing the size of the message object 34 that has not been displayed for the reference display time period is changed, it becomes more difficult to view the message object 34, but the size of the message object 34 is guaranteed not to be changed until the reference display time period has elapsed, and hence the message object 34 that has not been displayed for the reference display time period can be kept in a visible state.

(3-2) Further, for example, the securement portion 74 may be configured to secure the region available for displaying the new message object 34 by changing the shape of the message object 34 that has been displayed for the reference display time period from the shape before the reference display time period has elapsed. The changing of the shape of the message object 34 can be paraphrased as changing of an outline shape of the message object 34.

FIG. 15 is a diagram for illustrating an example of the game screen 30 according to Modification Example (3-2). As illustrated in FIG. 15, the securement portion 74 is configured to change, when the new message object 34 is displayed, the shape of the message object 34A that has been displayed for the reference display time period so as to eliminate the need to use the display region of another message object 34. When the securement portion 74 changes the shape of the message object 34A, the size of the message object 34A may change, or may be inhibited from changing.

According to Modification Example (3-2), the shape of the message object 34 that has been displayed for the reference display time period is changed to secure the region available for displaying the new message object 34, which eliminates the need to use the display region of the message object 34 that has not been displayed for the reference display time period when the new message object 34 is displayed, to thereby be able to ensure the time period for confirming the message object 34 that has not been displayed for the reference display time period. Supposing the shape of the message object 34 that has not been displayed for the reference display time period is changed, it becomes more difficult to view the message object 34 because the appearance thereof changes, but the shape of the message object 34 is guaranteed not to be changed until the reference display time period has elapsed, and hence the message object 34 that has not been displayed for the reference display time period can be kept in a visible state.

(3-3) Further, for example, the securement portion 74 may be configured to secure the region available for displaying the new message object 34 by changing the orientation of the message object 34 that has been displayed for the reference display time period from the orientation before the reference display time period has elapsed.

FIG. 16 is a diagram for illustrating an example of the game screen 30 according to Modification Example (3-3). As illustrated in FIG. 16, the securement portion 74 is configured to change, when the new message object 34 is displayed, the orientation of the message object 34A that has been displayed for the reference display time period so as to eliminate the need to use the display region of another message object 34.

The changing of the orientation of the message object 34A means changing of the message object 34A in its orientation about a predetermined rotation axis. For example, in FIG. 15, the shape of the message object 34A is changed to display a character string vertically, while in FIG. 16, the message object 34A is rotated by such an angle as to avoid overlapping with the new message object 34C, and the character string is also rotated by the same angle. As a result, an angle formed by the direction of the message object 34A and an Xs-axis or a Ys-axis illustrated in FIG. 16 is changed.

When the orientation of the message object 34A is changed, the size of the message object 34A may change, or may be inhibited from changing.

According to Modification Example (3-3), the orientation of the message object 34 that has been displayed for the reference display time period is changed to secure the region available for displaying the new message object 34, which eliminates the need to use the display region of the message object 34 that has not been displayed for the reference display time period when the new message object 34 is displayed, to thereby be able to ensure the time period for confirming the message object 34 that has not been displayed for the reference display time period. Supposing the orientation of the message object 34 that has not been displayed for the reference display time period is changed, it becomes more difficult to view the message object 34 because the orientation thereof changes, but the orientation of the message object 34 is guaranteed not to be changed until the reference display time period has elapsed, and hence the message object 34 that has not been displayed for the reference display time period can be kept in a visible state.

(3-4) Further, for example, the securement portion 74 may be configured to secure the region available for displaying the new message object 34 by changing the display position of the message object 34 that has been displayed for the reference display time period from the display position before the reference display time period has elapsed.

Figure 17:
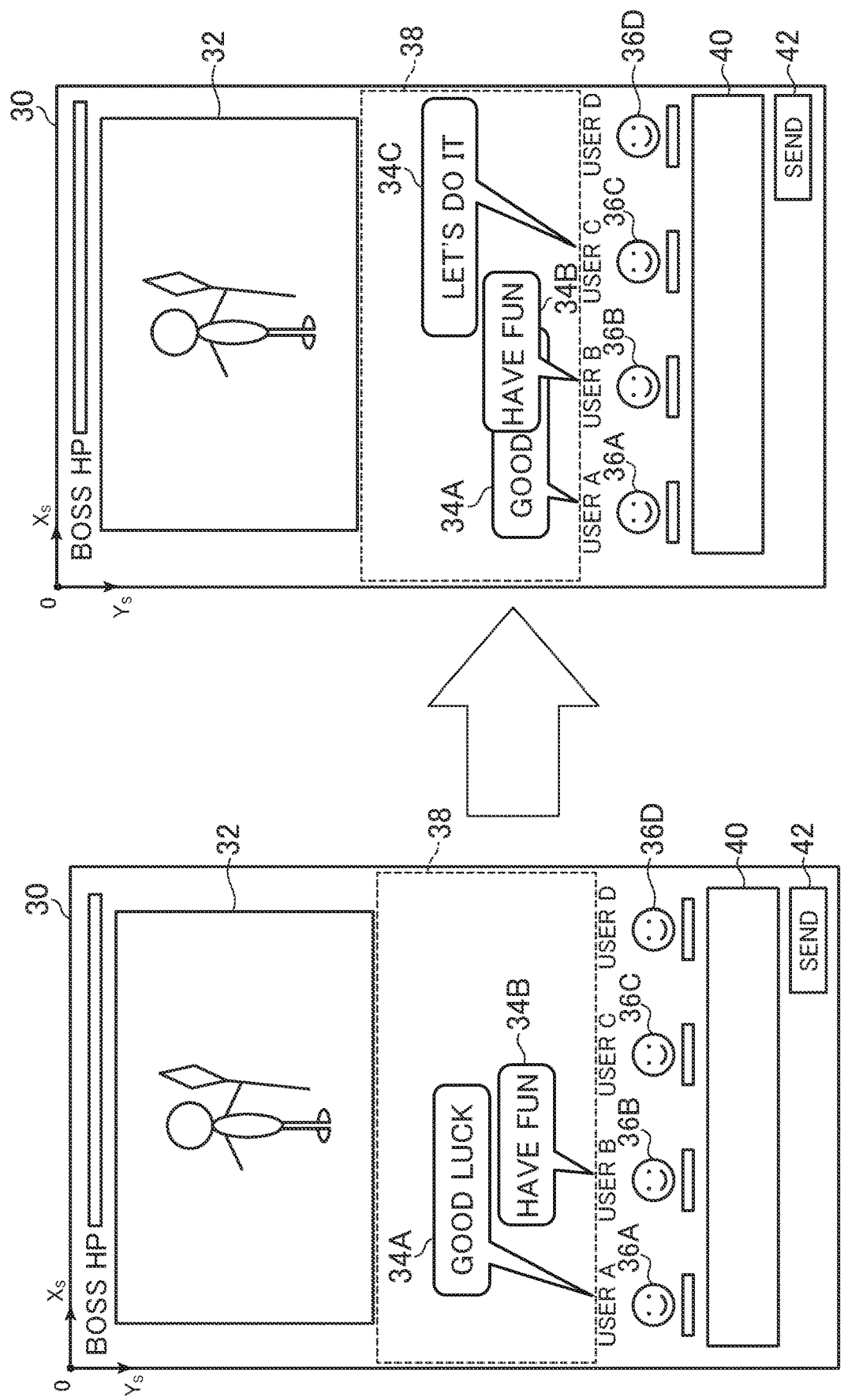
FIG. 17 is a diagram for illustrating an example of a game screen according to Modification Example (3-4) of the present invention.

FIG. 17 is a diagram for illustrating an example of the game screen 30 according to Modification Example (3-4). As illustrated in FIG. 17, the securement portion 74 is configured to change, when the new message object 34 is displayed, the display position of the message object 34A that has been displayed for the reference display time period so as to eliminate the need to use the display region of another message object 34. When the display position of the message object 34A is changed, the size of the message object 34A may change, or may be inhibited from changing.

According to Modification Example (3-4), the display position of the message object 34 that has been displayed for the reference display time period is changed to secure the region available for displaying the new message object 34, which eliminates the need to use the display region of the message object 34 that has not been displayed for the reference display time period when the new message object 34 is displayed, to thereby be able to ensure the time period for confirming the message object 34 that has not been displayed for the reference display time period. Supposing the display position of the message object 34 that has not been displayed for the reference display time period is changed, it becomes more difficult to view the message object 34 because the user needs to follow the message object 34 with his or her eyes, but the display position of the message object 34 is guaranteed not to be changed until the reference display time period has elapsed, and hence the message object 34 that has not been displayed for the reference display time period can be kept in a visible state.

(3-5) The above description is directed to the case where the display control unit 72 displays the new message object 34 through the direct use of the display region of the message object 34 that has been displayed for the reference display time period, but as described above, the display control unit 72 may be configured to indirectly use the display region of the message object 34 that has been displayed for the reference display time period.

The indirect use of at least a part of the display region of the message object 34 that has been displayed for the reference display time period means the displaying of the new message object 34 in at least a part of the display region that was occupied by the message object 34 that has not been displayed for the reference display time period before its movement (that is, region that has become free due to the movement of the message object 34 that has not been displayed for the reference display time period) so as to be displayed in at least a part of the display region of the message object 34 that has been displayed for the reference display time period by changing the display of the message object 34 that has not been displayed for the reference display time period (for example, moving the message object 34 or changing the shape, orientation, or size of the message object 34). For example, the securement portion 74 moves the message object 34 that has not been displayed for the reference display time period onto the message object 34 that has been displayed for the reference display time period, to thereby secure the region for displaying the new message object 34. Then, the display control unit 72 displays the new message object 34 through the use of at least apart of the region secured in the above-mentioned manner.

FIG. 18 is a diagram for illustrating an example of the game screen 30 obtained when the display region of the message object 34 that has been displayed for the reference display time period is used indirectly. In the example illustrated in FIG. 18, when the reference display time period for the message object 34A has elapsed, the securement portion 74 moves the message object 34B that has not been displayed for the reference display time period onto the message object 34A. In this case, the region in which the message object 34B was displayed before the movement is secured as the region for displaying the new message object 34C. In this manner, the securement portion 74 may be configured to secure the region for displaying the new message object 34 through the indirect use of the display region of the message object 34 that has been displayed for the reference display time period without changing the display mode or display position of the message object 34 that has been displayed for the reference display time period.

(4) Further, for example, as the message represented by the message object 34 becomes longer, it takes longer time to confirm the message, and hence the reference display time period may be changed depending on the length of the message. The message display control device 20 according to this modification example includes the reference display time period setting unit 78. The following processing conducted by the reference display time period setting unit 78 is executed by the control unit 21. The reference display time period setting unit 78 is configured to set the reference display time period for each of the at least one of the plurality of message objects 34 displayed on the display unit 25 based on the number of symbols included in the message represented by the message object 34 (that is, the number of characters that form the message; hereinafter referred to as "length of the message").

FIG. 19 is a table for showing a storage example of the message data. As shown in FIG. 19, the reference display time period setting unit 78 sets the reference display time period longer as the message becomes longer, and sets the reference display time period shorter as the message becomes shorter. Data (for example, mathematical expressions and tables) required by the reference display time period setting unit 78 for setting the reference display time period is assumed to be stored on the data storage unit 60. Further, in this case, the case where the reference display time period setting unit 78 is achieved by the message display control device 20 is described, and hence the message display control server 10 may be configured to acquire the reference display time period set by the reference display time period setting unit 78, and to store the reference display time period in the message database of the data storage unit 50.

According to Modification Example (4), it is possible to ensure the display time period corresponding to the length of the message. The reference display time period setting unit 78 may also be configured to change the reference display time period depending on not only the length of the message but also the user's setting or the situation of the game.

(5-1) Further, for example, in a case where, when the new message object 34 is displayed, none of the message objects 34 that have already been displayed has been displayed for the reference display time period and there is no free region, the display of the new message object 34 may be put on standby. The putting on standby of the display of the new message object 34 means maintaining (holding) of a state in which the message object 34 representing a newly input message is inhibited from being displayed. As a result, the start of the display of the message object 34 is delayed.

In this modification example, the following processing conducted by the standby portion 76 of the display control unit 72 is executed by the control unit 21. The standby portion 76 is configured to put on standby the display of the new message object 34 on the display unit 25 when it is necessary to use at least a part of the display region of the at least one of the plurality of message objects 34 displayed on the display unit 25 in order to display the message object 34 on the display unit 25 and when the at least one of the plurality of message objects 34 displayed on the display unit 25 does not include the message object 34 that has been displayed for the reference display time period.

Figure 20:
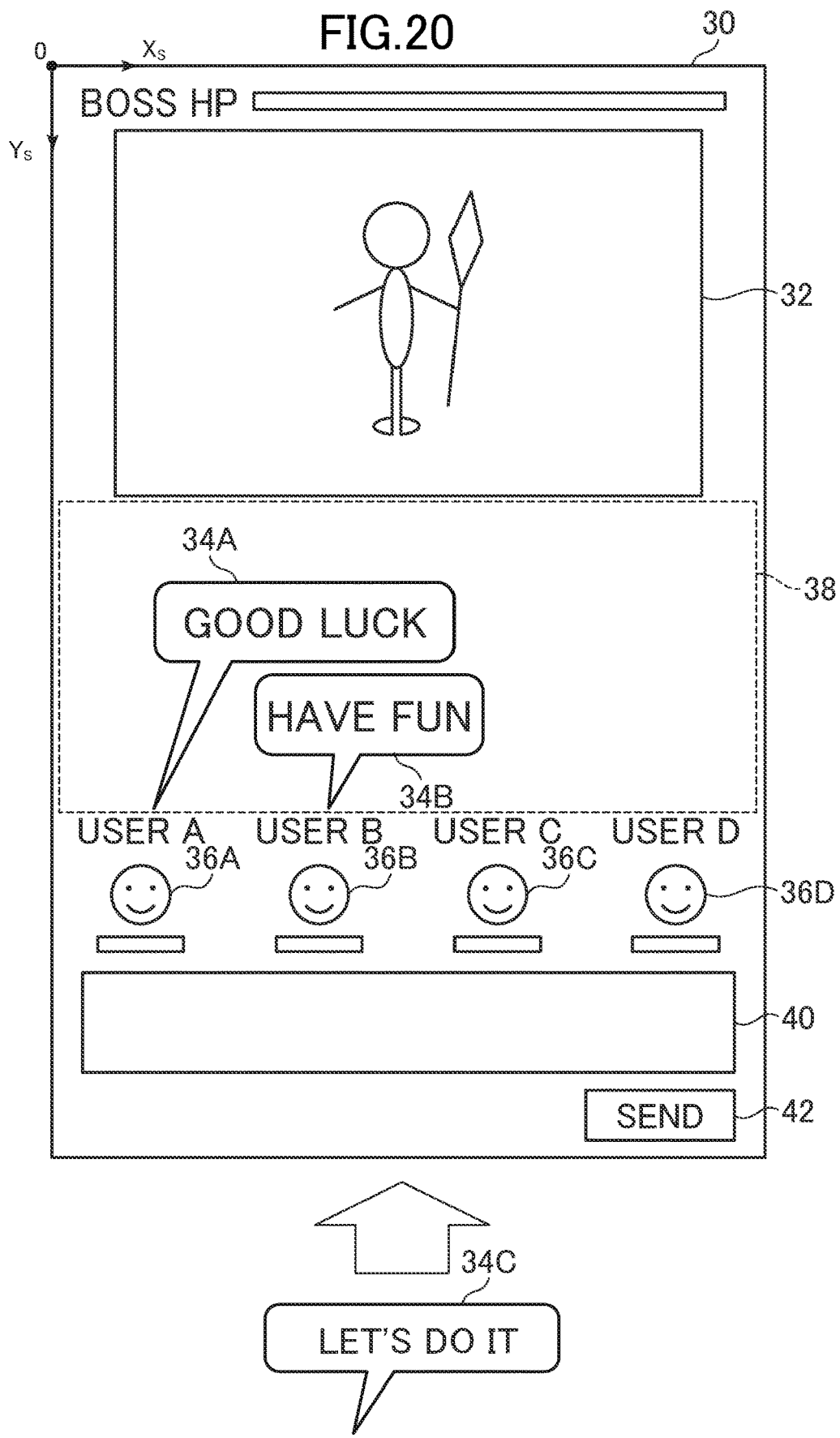
FIG. 20 is a diagram for illustrating how display of the message object is put on standby.

FIG. 20 is a diagram for illustrating how the display of the message object 34 is put on standby. In the example illustrated in FIG. 20, the displayable region 38 has no free region for displaying the new message object 34C, and neither of the message objects 34A and 34B that have already been displayed has been displayed for the reference display time period. In this case, the standby portion 76 delays the timing to start the display of the new message object 34C.

For example, the standby portion 76 stands by for the start of the display of the message object 34C until any one of the message objects 34A and 34B that have already been displayed has been displayed for the reference display time period. In this case, the message object 34A is the first to have been displayed for the reference display time period, and hence the display control unit 72 displays the message object 34C when the reference display time period for the message object 34A has elapsed. In this case, the game screen 30 is the same as that of FIG. 4, and the display control unit 72 updates the message display management information based on the display coordinates of the message object 34C and the current time in the same manner as in the embodiment.

According to Modification Example (5-1), the display of a new message is put on standby when the message objects 34 displayed on display means include no message objects 34 that have been displayed for the reference display time period, to thereby be able to ensure the time period for displaying each of the message objects 34.

(5-2) Further, for example, when there are a large number of message objects 34 on standby to be displayed, which have been put on standby to be displayed by the standby portion 76, no more input of a new message may be received. The message display control device 20 according to this modification example includes the restriction unit 80, the standby number determination unit 82, and the standby number determination result acquisition unit 84. The following processing conducted by the restriction unit 80, the standby number determination unit 82, and the standby number determination result acquisition unit 84 is executed by the control unit 21. The standby number determination unit 82 is configured to determine whether or not the number of new message objects 34 that have been put on standby to be displayed on the display unit 25 is equal to or larger than a threshold value.

The threshold value is stored on the data storage unit 60, and may be any one of a fixed value and a variable value. When being the variable value, the threshold value may change depending on the user's setting, or may change depending on the situation of the game in execution. The standby number determination result acquisition unit 84 is configured to acquire a determination result made by the standby number determination unit 82. The standby number determination result acquisition unit 84 acquires, from the standby number determination unit 82, information indicating that the number of display objects on standby to be displayed is equal to or larger than the threshold value or information indicating that the number of display objects on standby to be displayed is less than the threshold value.

The restriction unit 80 is configured to restrict reception of the input of a new message when it is determined that the number of new message objects 34 that have been put on standby to be displayed on the display unit 25 is equal to or larger than the threshold value. The restricting of the reception of the input of a new message means restricting of an input operation for inputting a new message or restricting of a transmission operation for transmitting a new message. For example, the restriction unit 80 is configured to inhibit the reception of the input operation for inputting a message (for example, input of a message into the input form 40). Further, for example, the restriction unit 80 is configured to receive the input into the input form 40 but to inhibit the reception of the transmission operation for transmitting a content of the input (to inhibit the send button 42 from being displayed, or to display the send button 42 but to inhibit the send button 42 from being selected by, for example, graying out the send button 42).

Figure 21:
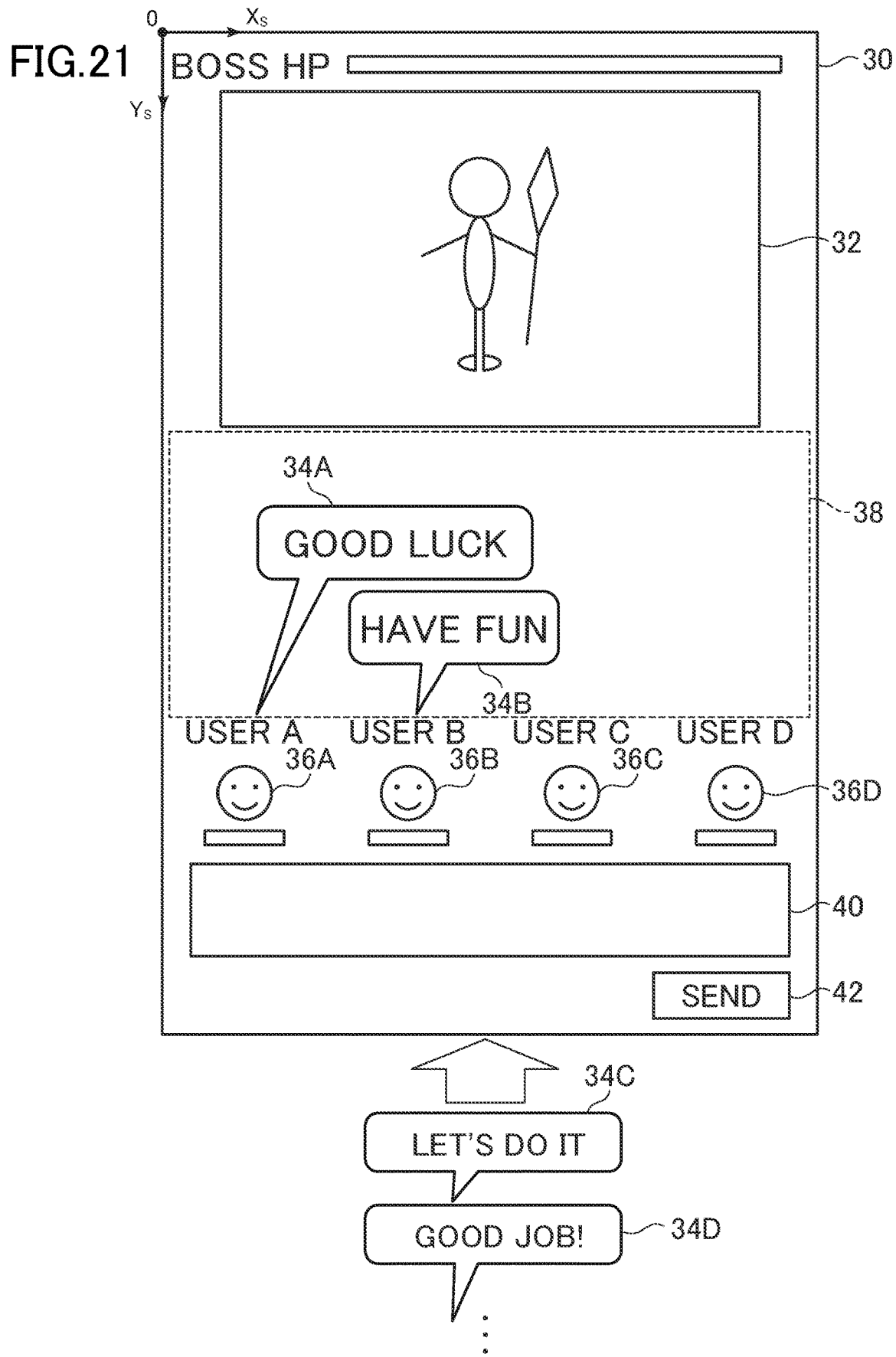
FIG. 21 is a diagram for illustrating an example of a game screen according to Modification Example (5-2) of the present invention.

FIG. 21 is a diagram for illustrating an example of the game screen 30 according to Modification Example (5-2). In the example illustrated in FIG. 21, the reference display time period for the message object 34A or 34B has not elapsed, and hence the standby portion 76 is in a standby state for the display of the message object 34C, a message object 34D, and the like. In addition, the standby number determination result acquisition unit 84 has acquired the information indicating that the number of display objects on standby to be displayed is equal to or larger than the threshold value from the standby number determination unit 82, and hence the send button 42 has been erased by the restriction unit 80 to restrict the input of a new message. Therefore, the number of message objects 34 on standby to be displayed is not to be further increased.

When it is determined that the number of new message objects 34 that have been put on standby to be displayed on the display unit 25 is less than the threshold value, the display control unit 72 lifts the restriction imposed by the restriction unit 80. That is, in the example of FIG. 21, the display control unit 72 enables the send button 42 to be selected.

According to Modification Example (5-2), when the number of message objects 34 that have been on standby to be displayed becomes relatively larger, the reception of the input of a message is restricted, and hence the number of display objects on standby to be displayed is prevented from increasing, to thereby be able to reduce a time lag between the input and display of the message.

(6) Further, for example, in Modification Example (5-1), in the case where, when the new message object 34 is displayed, none of the message objects 34 that have already been displayed has been displayed for the reference display time period and there is no free region, the display of the new message object 34 is put on standby, while in Modification Example (5-2), when the number of message objects 34 on standby to be displayed becomes equal to or larger than the threshold value, the input of a new message is restricted. However, the input of a new message may be restricted when none of the message objects 34 that have already been displayed has been displayed for the reference display time period and when there is no free region.

The restriction unit 80 according to this modification example may be configured to restrict the reception of the input of a new message when it is necessary to use at least a part of the display region of each of the at least one of the plurality of message objects 34 displayed on the display unit 25 in order to display the new message object 34 on the display unit 25 and when the at least one of the plurality of message objects 34 displayed on the display unit 25 does not include the message object 34 that has been displayed for the reference display time period. The above-mentioned restriction itself is the same as that of Modification Example (5-2).

Figure 22:
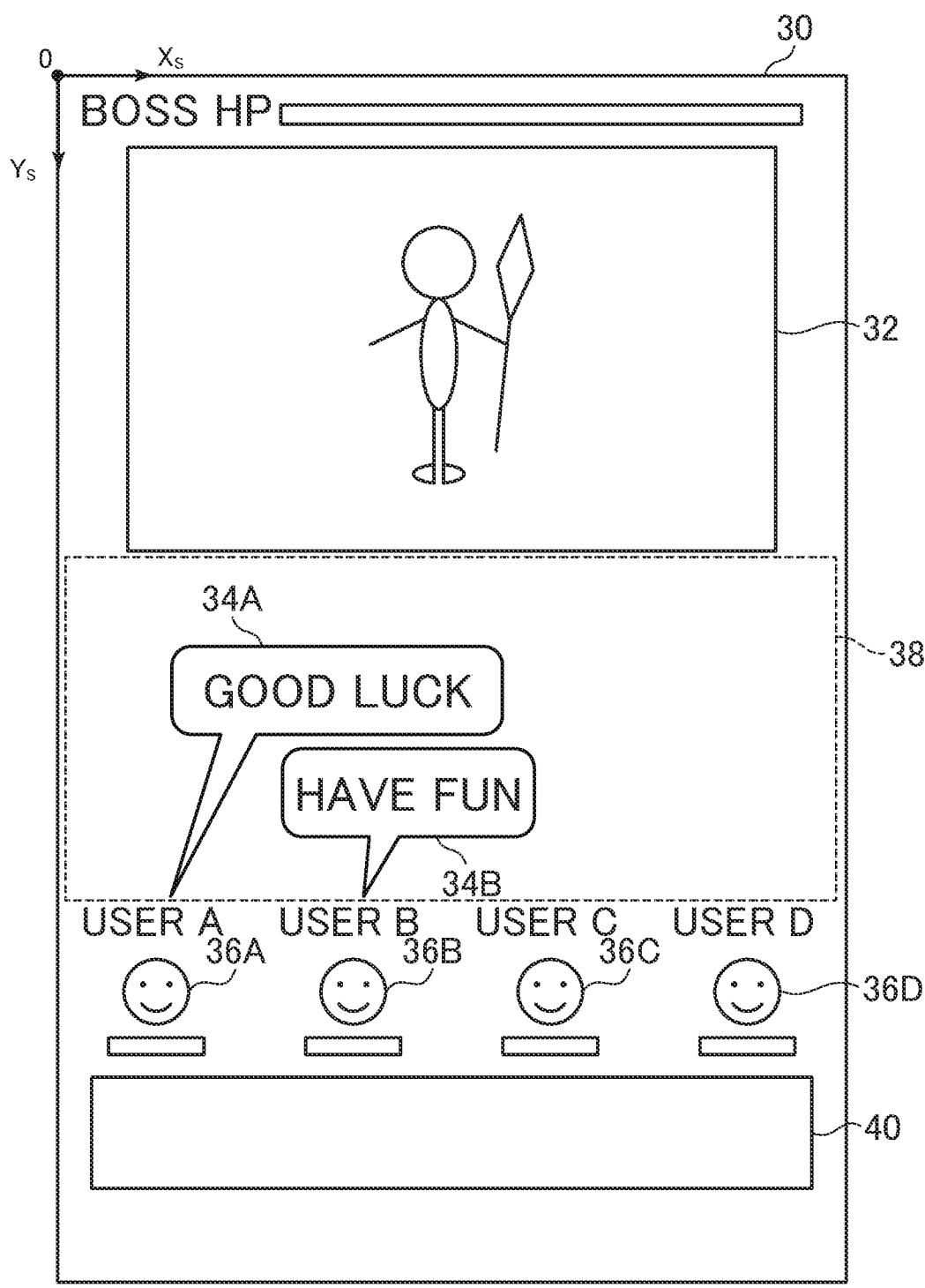
FIG. 22 is a diagram for illustrating an example of a game screen according to Modification Example (6) of the present invention.

FIG. 22 is a diagram for illustrating an example of the game screen 30 according to Modification Example (6). In the example illustrated in FIG. 22, it is assumed that the reference display time period for the message object 34A or 34B has not elapsed, and there is not a sufficient region for displaying the new message object 34 within the displayable region 38. For example, the necessity determination unit 66 determines whether or not the area of the region within the displayable region 38, in which neither of the message objects 34A and 34B that have not been displayed for the reference display time period is being displayed, is equal to or smaller than a reference. Information indicating the above-mentioned reference is assumed to be stored on the data storage unit 60 in advance. When the area is equal to or smaller than the reference, the necessity determination unit 66 determines that it is necessary to use at least a part of the display region of the message object 34. In this case, as illustrated in FIG. 22, the send button 42 is erased by the restriction unit 80 to restrict the input of a new message.

According to Modification Example (6), the reception of the input of a new message is restricted when the region for newly displaying the message cannot be secured, and hence it is possible to prevent the message object 34 from becoming invisible even though the reference display time period has not elapsed, to thereby be able to ensure the time period for displaying the message object 34.

(7) Further, for example, two or more of the above-mentioned modification examples may be combined.

Further, for example, the display control processing (processing of S2 to S5) relating to the message object 34 that has already been displayed and the display control processing (processing of S6 to S19) relating to the new message object 34, which are described with reference to FIG. 8 and FIG. 9, may be replaced in the position in the order. That is, after the processing for displaying the new message object 34 is executed, it may be determined whether or not the reference display time period for the message object 34 that has already been displayed has elapsed or whether or not the display time limit has been reached.

Further, for example, instead of storing the display start time, the message data may store the remaining time period until the elapse of the reference display time period and the remaining time period until the display time limit has been reached. In this case, the display control unit 72 decreases those remaining time periods as time elapses after the message object 34 started being displayed. When the remaining time period until the elapse of the reference display time period becomes zero, the elapse determination unit 62 determines that the reference display time period has elapsed. In the same manner, when the remaining time period until the display time limit is reached becomes zero, the display control unit 72 determines that the display time limit has been reached. More specifically, assuming that the reference display time period is 2 seconds, the display time limit is 5 seconds, and an interval at which the processing of FIG. 8 and FIG. 9 is executed is 1/60 seconds, when newly displaying the message object 34, the display control unit 72 may set those remaining time periods to "120" and "300", respectively, so that each numerical value is decremented by 1 each time the processing is executed.

Further, for example, Modification Example (3-1) is described by taking the case where the message object 34 that has been displayed for the reference display time period becomes smaller, but the display control unit 72 may be configured to cause the new message object 34 to become smaller. For example, the display control unit 72 may be configured to cause the new message object 34 to become smaller than a normal size so as to fall within the free region of the displayable region 38 when the at least one of the plurality of message objects 34 displayed on the display unit 25 does not include the message object 34 that has been displayed for the reference display time period.

Further, for example, the case where the data generation unit 54 is achieved by the message display control server 10 has been described, but the data generation unit 54 may be achieved by the message display control device 20. In this case, the data generation unit 54 may be configured to generate, when receiving the input of a message, the message data relating to the received message. In this case, the message data generated by the message display control device 20 is transmitted to the message display control server 10 through the transmission/reception unit 70. The message display control server 10 stores the message data in the message database, and also distributes the message data to the other message display control devices 20. In this case, there is no need to generate the message data on the message display control server 10, which alleviates load imposed on the message display control server 10. In addition, for example, the data generation unit 54 of the message display control device 20 may be configured to generate, when acquiring the message input notification from another message display control device 20, the message data based on the acquired message input notification. With this configuration, only the message input notification having a relatively small data amount is exchanged on the communication network 2, which can suppress an amount of data to be transmitted and received. The method itself of generating the message data in this case is the same as the method described in the embodiment.

Further, for example, the respective functions described as being included in the message display control device 20 may be achieved by the message display control server 10. For example, the elapse determination unit 62 and the elapse determination result acquisition unit 64 may be achieved by the message display control server 10. In this case, the elapse determination unit 62 and the elapse determination result acquisition unit 64 are achieved mainly by the control unit 11. The elapse determination unit 62 may be configured to execute the determination processing by acquiring the measurement start timing from each message display control device 20. In addition, the elapse determination unit 62 may be achieved by the message display control server 10, and the elapse determination result acquisition unit 64 may be achieved by the message display control device 20. In this case, the elapse determination result acquisition unit 64 of the message display control device 20 acquires the determination result made by the elapse determination unit 62 of the message display control server 10 through the communication network 2. Further, in contrast to the above-mentioned configuration, the elapse determination result acquisition unit 64 may be achieved by the message display control server 10, and the elapse determination unit 62 may be achieved by the message display control device 20. In this case, the elapse determination result acquisition unit 64 of the message display control server 10 acquires the determination result made by the elapse determination unit 62 of the message display control device 20 through the communication network 2.

Further, for example, the necessity determination unit 66 and the necessity determination result acquisition unit 68 may be achieved by the message display control server 10. In this case, the necessity determination unit 66 and the necessity determination result acquisition unit 68 are achieved mainly by the control unit 11. The necessity determination unit 66 may be configured to acquire the message display management information from each message display control device 20 to conduct the determination processing, or to store the message display management information of each message display control device 20 on the data storage unit 50 in advance and refer to the stored message display management information to conduct the determination processing. In addition, the necessity determination unit 66 may be achieved by the message display control server 10, and the necessity determination result acquisition unit 68 may be achieved by the message display control device 20. In this case, the necessity determination result acquisition unit 68 of the message display control device 20 acquires the determination result made by the necessity determination unit 66 of the message display control server 10 through the communication network 2. Further, in contrast to the above-mentioned configuration, the necessity determination result acquisition unit 68 may be achieved by the message display control server 10, and the necessity determination unit 66 may be achieved by the message display control device 20. In this case, the necessity determination result acquisition unit 68 of the message display control server 10 acquires the determination result made by the necessity determination unit 66 of the message display control device 20 through the communication network 2.

Further, for example, when the main functions are achieved by the message display control server 10, the transmission/reception unit 70 transmits data to be used for displaying the new message object 34 on the display unit 25, on which the at least one of the plurality of message objects 34 are being displayed, to the message display control device based on the determination result acquired by the elapse determination result acquisition unit 64. The above-mentioned data may be the message data of the new message object 34 or the message display management information, or may be image data on the game screen 30 when the image data on the game screen 30 itself is created by the message display control server 10.

Further, for example, the display control unit 72 may be achieved by the message display control server 10. In this case, the display control unit 72 is achieved mainly by the control unit 11. The display control unit 72 of the message display control server 10 may be configured to generate data to be used for displaying the new message object 34 based on the message input notification and the message data that have been received from each message display control device 20. The above-mentioned data may be the image data on the game screen 30, or the image data on the new message object 34 or data indicating the display position of the new message object 34. In addition, for example, the above-mentioned data may be the message data on the message represented by the new message object 34. In addition, the data storage unit 50 may store the message display management information, and the message display control server 10 may update the message display management information. In the same manner, the securement portion 74 and the standby portion 76 may be achieved by the message display control server 10. In this case, the securement portion 74 transmits an instruction indicating that the size, shape, orientation, or display position of the message object 34 is to be changed to each message display control device 20, to thereby secure the region for displaying the new message object 34. In addition, the standby portion 76 may be configured to transmit an instruction indicating that the display of the new message object 34 is to be put on standby to the message display control device 20, or to put on standby the transmission of the data to be used for displaying the new message object 34.

Further, for example, the reference display time period setting unit 78 may be achieved by the message display control server 10. In this case, the reference display time period setting unit 78 is achieved mainly by the control unit 11. For example, the reference display time period setting unit 78 of the message display control server 10 distributes information indicating the reference display time period to each of the message display control devices 20.

Further, for example, the restriction unit 80 may be achieved by the message display control server 10. In this case, the restriction unit 80 is achieved mainly by the control unit 11. For example, the restriction unit 80 of the message display control server 10 restricts the communication from each message display control device 20 to inhibit the message input notification from being received.

Further, for example, the standby number determination unit 82 and the standby number determination result acquisition unit 84 may be achieved by the message display control server 10. In this case, the standby number determination unit 82 and the standby number determination result acquisition unit 84 are achieved mainly by the control unit 11. The standby number determination unit 82 may be configured to acquire the message display management information from each message display control device 20 to conduct the determination processing, or to store the message display management information of each message display control device 20 on the data storage unit 50 in advance and refer to the stored message display management information to conduct the determination processing. In addition, the standby number determination unit 82 may be achieved by the message display control server 10, and the standby number determination result acquisition unit 84 may be achieved by the message display control device 20. In this case, the standby number determination result acquisition unit 84 of the message display control device 20 acquires the determination result made by the standby number determination unit 82 of the message display control server 10 through the communication network 2. Further, in contrast to the above-mentioned configuration, the standby number determination result acquisition unit 84 may be achieved by the message display control server 10, and the standby number determination unit 82 may be achieved by the message display control device 20. In this case, the standby number determination result acquisition unit 84 of the message display control server 10 acquires the determination result made by the standby number determination unit 82 of the message display control device 20 through the communication network 2.

Further, for example, the case where the message represented by the message object 34 is the message input by each of one or a plurality of users has been described, but the message represented by the message object 34 may be a message defined in advance. For example, the user may be allowed to input a message by selecting any one of a plurality of messages provided in advance. In addition, the description has been made by taking a scene in which a plurality of users have a chat as an example, but the display control described above may be applied to a scene in which one user has a chat. Further, the message object 34 does not need to be the image having a balloon shape described above. The message object 34 may be any image that represents a message, and various images can be employed.

Further, for example, the case where the common game screen 30 is displayed on each message display control device 20 has been described, but the game screen 30 may differ depending on each message display control device 20. For example, when the message display control device 20 receives a predetermined operation, the message object 34 on the game screen 30 displayed by the message display control device 20 may be erased. In this case, the content of the message display management information differs among the respective message display control devices 20.

Further, for example, the message display control system 1 may include only the message display control device 20 without the message display control server 10. Even in this case, any one of the message display control devices 20 may be configured to serve as a server. In addition, in this case, the message display control device 20 configured to serve as a server may not exist. That is, the individual message display control devices 20 may be configured to transmit the message data to each of the other message display control devices 20.

Further, for example, a message display control device, a message display control server, and a message display control system according to the present invention only need to be applied to a technology for displaying the message object without being limited to the scene of the chat within the game, and can be applied to a technology other than the chat. For example, the present invention can also be applied to an electronic bulletin board configured to allow a plurality of users to post a message.

6. Supplemental

The present invention is grasped, for example, as follows based on the above descriptions. A message display control device according to one embodiment of the present invention relates to a message display control device comprising at least one processor configured to: display at least one of a plurality of message objects on a display; acquire a determination result about whether or not a reference display time period has elapsed for each of the at least one of the plurality of message objects; and display a new message object on the display, on which the at least one of the plurality of message objects are displayed, based on the determination result.

Further, a message display control server according to one embodiment of the present invention relates to a message display control server comprising at least one processor configured to: communicate to and from a message display control device that displays a new message object on display on which at least one of a plurality of message objects are displayed; acquire a determination result made about whether or not a reference display time period has elapsed for each of the at least one of the plurality of message objects displayed on the display; and transmit data to be used for displaying the new message object on the display, on which the at least one of the plurality of message objects are displayed, to the message display control device based on the determination result.

Further, a message display control system according to one embodiment of the present invention relates to a message display control system comprising at least one processor configured to:

display a new message object on display on which at least one of a plurality of message objects are displayed; determine whether or not a reference display time period has elapsed for each of the at least one of the plurality of message objects displayed on the display; and display the new message object on the display on which the at least one of the plurality of message objects are displayed based on a determination result.

Further, a program according to one embodiment of the present invention causes a computer to: display at least one of a plurality of message objects on a display; acquire a determination result about whether or not a reference display time period has elapsed for each of the at least one of the plurality of message objects; and display a new message object on the display, on which the at least one of the plurality of message objects are displayed, based on the determination result.

Further, an information storage medium according to one embodiment of the present invention is a computer-readable information storage medium having the above-mentioned program recorded thereon.

Further, according to one mode of the present invention, the at least one processor displays the new message object on the display through use of at least a part of a display region of a message object that has been displayed for the reference display time period.

Further, according to one mode of the present invention, the at least one processor: acquires a determination result about whether or not it is necessary to use at least apart of the display region of the at least one of the plurality of message objects for the new message object; and displays, if it is necessary to use the at least a part, the new message object through use of the at least a part of the display region of the message object that has been displayed for the reference display time period.

Further, according to one mode of the present invention, the at least one processor displays the new message object so as to be superimposed on at least a part of the message object that has been displayed for the reference display time period.

Further, according to one mode of the present invention, the at least one processor displays, in at least a part of the display region of the message object that has been displayed for the reference display time period, at least a part of the message object and at least a part of the new message object.

Further, according to one mode of the present invention, the at least one processor: erases at least a part of the message object that has been displayed for the reference display time period; and displays the new message object through use of a region in which the at least a part was displayed.

Further, according to one mode of the present invention, the at least one processor displays, if a plurality of message objects has been displayed for the reference display time period, the new message object through use of at least a part of a display region of a message object that has been displayed for a longest time period after an elapse of the reference display time period.

Further, according to one mode of the present invention, the at least one processor: erases the at least one of the plurality of message objects displayed on the display if a display time limit is reached; and displays, if a plurality of message objects has been displayed for the reference display time period, the new message object through use of at least a part of a display region of a message object having a shortest remaining time period until the display time limit is reached.

Further, according to one mode of the present invention, the at least one processor displays, if no message object has been displayed for the reference display time period, the new message object through use of at least a part of a display region of a message object having a shortest remaining time period until an elapse of the reference display time period.

Further, according to one mode of the present invention, the at least one processor causes a size of the message object that has been displayed for the reference display time period to become smaller than a size of the message object before the reference display time period has elapsed, to thereby expand a region available for displaying the new message object.

Further, according to one mode of the present invention, the at least one processor changes a shape of the message object that has been displayed for the reference display time period from a shape of the message object before the reference display time period has elapsed, to thereby secure a region available for displaying the new message object.

Further, according to one mode of the present invention, the at least one processor changes an orientation of the message object that has been displayed for the reference display time period from an orientation of the message object before the reference display time period has elapsed, to thereby secure a region available for displaying the new message object.

Further, according to one mode of the present invention, the at least one processor changes a display position of the message object that has been displayed for the reference display time period from a display position of the message object before the reference display time period has elapsed, to thereby secure a region available for displaying the new message object.

Further, according to one mode of the present invention, the at least one processor sets the reference display time period for each of the at least one of the plurality of message objects displayed on the display based on a number of symbols included in a message represented by the each of the at least one of the plurality of message objects.

Further, according to one mode of the present invention, the at least one processor: acquires a first determination result about whether or not it is necessary to use at least a part of a display region of the at least one of the plurality of message objects for the new message object; acquires a second determination result about whether or not no message object has been displayed for the reference display time period; and puts on standby the displaying of the new message object on the display based on the first determination and the second determination.

Further, according to one mode of the present invention, the at least one of the plurality of message objects displayed on the display each representing a message input by each of one or a plurality of users; and the at least one processor: acquires a determination result about whether or not a number of new message objects that have been put on standby to be displayed on the display is equal to or larger than a threshold value; and restricts reception of input of the new message if it is determined that the number of new message objects that have been put on standby to be displayed on the display is equal to or larger than the threshold value.

Further, according to one mode of the present invention, the at least one of the plurality of message objects each representing a message input by each of one or a plurality of users; and the at least one processor: acquires a first determination result about whether or not it is necessary to use at least a part of a display region of the at least one of the plurality of message objects for the new message object; acquires a second determination result about whether or not no message object has been displayed for the reference display time period; and restricts reception of input of the new message based on based on the first determination result and the second determination result.

What is claimed is:

1. A message display control system comprising at least one processor configured to:
   display a plurality of message objects on a display in a chat in which a plurality of users participate;
   determine whether or not a reference display time period for each of the plurality of message objects has elapsed, the reference display time period being a time beginning from displaying a message object to a time when the message object is permitted to be overwritten with a new message object;
   when it is determined that the reference display time period has not elapsed for any of the plurality of message objects displayed, prohibit the display to display the new message object even if a new message in the chat is input; and
   when it is determined that the reference display time period has elapsed for any one of the plurality of message objects displayed, permit the display to display the new message object on the display, and display the new message object and stop displaying the message object with the elapsed reference display time period.

2. The message display control system according to claim 1, the at least one processor displays the new message object on the display through use of at least a part of a display region of at least one of the plurality of message objects that has been displayed for the reference display time period.

3. The message display control system according to claim 2, the at least one processor:
   acquires a determination result about whether or not it is necessary to use at least a part of the display region of the at least one of the plurality of message objects for the new message object; and
   displays, if it is necessary to use the at least a part, the new message object through use of the at least a part of the display region of at least one of the plurality of message objects that has been displayed for the reference display time period.

4. The message display control system according to claim 2, the at least one processor displays the new message object so as to be superimposed on at least a part of at least one of the plurality of message objects that has been displayed for the reference display time period.

5. The message display control system according to claim 2, the at least one processor displays, in at least a part of the display region of the message object that has been displayed for the reference display time period, at least a part of at least one of the plurality of message objects and at least a part of the new message object.

6. The message display control system according to claim 2, the at least one processor:
   erases at least a part of at least one of the plurality of message objects that has been displayed for the reference display time period; and
   displays the new message object through use of a region in which the at least a part was displayed.

7. The message display control system according to claim 2, the at least one processor displays, if a plurality of message objects has been displayed for the reference display time period, the new message object through use of at least a part of a display region of at least one of the plurality of message objects that has been displayed for a longest time period after an elapse of the reference display time period.

8. The message display control system according to claim 2, the at least one processor:
   erases the at least one of the plurality of message objects displayed on the display if a display time limit is reached; and
   displays, if a plurality of message objects has been displayed for the reference display time period, the new message object through use of at least a part of a display region of a message object having a shortest remaining time period until the display time limit is reached.

9. The message display control system according to claim 2, the at least one processor displays, if no message object has been displayed for the reference display time period, the new message object through use of at least a part of a display region of a message object having a shortest remaining time period until an elapse of the reference display time period.

10. The message display control system according to claim 2, the at least one processor causes a size of at least one of the plurality of message objects that has been displayed for the reference display time period to become smaller than it was before the reference display time period elapsed, to thereby expand a region available for displaying the new message object.

11. The message display control system according to claim 2, the at least one processor changes a shape of at least one of the plurality of message objects that has been displayed for the reference display time period from a shape of at least one of the plurality of message objects before the reference display time period has elapsed, to thereby secure a region available for displaying the new message object.

12. The message display control system according to claim 2, the at least one processor changes an orientation of at least one of the plurality of message objects that has been displayed for the reference display time period from an orientation of at least one of the plurality of message objects before the reference display time period has elapsed, to thereby secure a region available for displaying the new message object.

13. The message display control device according to claim 2, the at least one processor changes a display position of at least one of the plurality of message objects that has been displayed for the reference display time period from a display position of at least one of the plurality of message objects before the reference display time period has elapsed, to thereby secure a region available for displaying the new message object.

14. The message display control system according to claim 1, the at least one processor sets the reference display time period for each of the at least one of the plurality of message objects displayed on the display based on a number of symbols included in a message represented by the each of the at least one of the plurality of message objects.

15. The message display control system according to claim 1, the at least one processor:
    acquires a first determination result about whether or not it is necessary to use at least a part of a display region of the at least one of the plurality of message objects for the new message object;
    acquires a second determination result about whether or not no message object has been displayed for the reference display time period; and
    puts on standby the displaying of the new message object on the display based on the first determination and the second determination.

16. The message display control system according to claim 15, the at least one of the plurality of message objects displayed on the display each representing a message input by each of one or a plurality of users; and
    the at least one processor:
        acquires a determination result about whether or not a number of new message objects that have been put on standby to be displayed on the display is equal to or larger than a threshold value; and
        restricts reception of input of the new message if it is determined that the number of new message objects that have been put on standby to be displayed on the display is equal to or larger than the threshold value.

17. The message display control system according to claim 1,
    the at least one of the plurality of message objects each representing a message input by each of one or a plurality of users; and
    the at least one processor:
        acquires a first determination result about whether or not it is necessary to use at least a part of a display region of the at least one of the plurality of message objects for the new message object;
        acquires a second determination result about whether or not no message object has been displayed for the reference display time period; and
        restricts reception of input of the new message based on the first determination result and the second determination result.

18. A message display control server comprising at least one processor configured to:
    communicate to and from a message display control device that displays a new message object on display on which at least one of a plurality of message objects are displayed in a chat in which a plurality of users participate;
    determine whether or not a reference display time period for each of the plurality of message objects has elapsed, the reference display time period being a time beginning from displaying a message object to a time when the message object is permitted to be overwritten with a new message object;
    when it is determined that the reference display time period has not elapsed for any of the plurality of message objects displayed, prohibit the display to display the new message object even if a new message in the chat is input; and
    when it is determined that the reference display time period has elapsed for any one of the plurality of message objects displayed, permit the display to display the new message object on the display, and display the new message object and stop displaying the message object with the elapsed reference display timer period.

19. A message display control device comprising at least one processor configured to:
    display a new message object on display on which at least one of a plurality of message objects are displayed in a chat in which a plurality of users participate;
    determine whether or not a reference display time period for each of the plurality of message objects has elapsed, the reference display time period being a time beginning from displaying a message object to a time when the message object is permitted to be overwritten with a new message object;
    when it is determined that the reference display time period has not elapsed for any of the plurality of message objects displayed, prohibit the display to display the new message object even if a new message in the chat is input; and
    when it is determined that the reference display time period has elapsed for any one of the plurality of message objects displayed, permit the display to display the new message object on the display, and display the new message object and stop displaying the message object with the elapsed reference display time period.

20. A non-transitory computer-readable information storage medium having recorded thereon a program for causing a computer to:
    display at least one of a plurality of message objects on a display in a chat in which a plurality of users participate;
    determine whether or not a reference display time period for each of the plurality of message objects has elapsed, the reference display time period being a time beginning from displaying a message object to a time when the message object is permitted to be overwritten with a new message object;
    when it is determined that the reference display time period has not elapsed for any one of the plurality of message objects displayed, prohibit the display to display the new message object even if a new message in the chat is input; and
    when it is determined that the reference display time period has elapsed for any one of the plurality of message objects displayed, permit the display to display the new message object on the display, and display the new message object and stop displaying the message object with the elapsed reference display time period.

* * * * *